United States Patent [19]
Ohtani et al.

[11] Patent Number: 5,685,285
[45] Date of Patent: Nov. 11, 1997

[54] INTERNAL COMBUSTION ENGINE CONTROLLER

[75] Inventors: Asahiko Ohtani, Mito; Masayoshi Hayasaka, Hitachinaka, both of Japan

[73] Assignees: Hitachi, Ltd., Tokyo; Hitachi Car Engineering Co., Ltd., Ibaraki, both of Japan

[21] Appl. No.: 669,693

[22] Filed: Jun. 24, 1996

[30] Foreign Application Priority Data

Jun. 22, 1995 [JP] Japan ................................. 7-155747

[51] Int. Cl.$^6$ ................................. F02D 41/00
[52] U.S. Cl. ................................. 123/698; 123/520
[58] Field of Search ................................. 123/698, 520, 123/674, 675, 519, 684, 679

[56] References Cited

U.S. PATENT DOCUMENTS

| | | | |
|---|---|---|---|
| 5,349,935 | 9/1994 | Mezger et al. | 123/520 |
| 5,465,703 | 11/1995 | Abe | 123/674 |
| 5,469,833 | 11/1995 | Hara et al. | 123/698 |
| 5,474,049 | 12/1995 | Nagaishi et al. | 123/520 |
| 5,497,757 | 3/1996 | Osanai | 123/674 |
| 5,507,269 | 4/1996 | Morikawa | 123/684 |
| 5,515,834 | 5/1996 | Hoshino et al. | 123/674 |
| 5,520,160 | 5/1996 | Aota et al. | 123/675 |
| 5,524,600 | 6/1996 | Wild | 123/698 |
| 5,529,047 | 6/1996 | Aota et al. | 123/674 |

FOREIGN PATENT DOCUMENTS

| | | | |
|---|---|---|---|
| 62-131962 | 6/1987 | Japan | 123/698 |
| 62-139941 | 6/1987 | Japan | 123/698 |
| 63-71536 | 3/1988 | Japan | 123/698 |
| 63-190541 | 12/1988 | Japan | 123/698 |
| 2-245461 | 10/1990 | Japan | 123/698 |
| 4-234553 | 8/1992 | Japan | 123/698 |
| 4-358750 | 12/1992 | Japan | 123/698 |
| 5-272417 | 10/1993 | Japan | 123/698 |

*Primary Examiner*—Raymond A. Nelli
*Attorney, Agent, or Firm*—Evenson, McKeown, Edwards & Lenahan P.L.L.C.

[57] ABSTRACT

The invention provides an internal combustion engine controller for an internal combustion engine having a fuel tank which can be purged of fuel vapor via a purge line connected through a canister unit, to a suction input of the internal combustion engine. The amount of fuel vapor stored in the canister or the amount of fuel vapor supplied to the internal combustion engine according to the operating state and operation range of the engine are calculated, and the purge control valve and air-fuel ratio control characteristics are adjusted using the calculated value. At the same time, appropriate control of the amount of fuel vapor and purge control valve when diagnosing the purge pipe system failure by application of pressure to the purge pipe system, are provided. Both internal combustion engine control with the minimum change in air-fuel ratio and purge control are ensured, and highly reliable diagnosis of the purge pipe system is realized.

29 Claims, 15 Drawing Sheets

INTERNAL COMBUSTION ENGINE CONTROLLER

BACKGROUND OF THE INVENTION

The present invention relates to an internal combustion engine controller which prevents a deterioration of engine operability and of exhaust gas components, when fuel vapor from a purge canister is fed to the suction system of the engine.

Environmental regulations for exhaust gas components have been tightened in recent years, and it is currently legally required to burn the fuel vapor in the internal combustion engine without discharging it into atmosphere. Generally, this requirement is met by ensuring that fuel vapor generated in the fuel tank is adsorbed by activated carbon, and that the fuel vapor released from activated carbon is fed to the engine intake air suction system. However, in practice, the concentration of actual fuel vapor is not constant, which makes it difficult to control the amount of fuel vapor fed to the suction system of the internal combustion engine, resulting in unsatisfactory air-fuel ratio control, poor operability and degradation of exhaust gas components.

To solve this problem, methods have been proposed to detect the amount of fuel vapor which is fed to the engine intake air suction system, in order to ensure accurate control of air-fuel ratio. For example, Japanese Patent Application Laid-Open No. 234553-1992 discloses a method of ensuring accurate control of the air-fuel ratio by calculating the weight of the fuel vapor evaporated from the fuel tank and fed to the suction system, on the basis of the amount of air fed to the canister and the total amount of air and fuel vapor supplied to the engine suction system from the canister.

Japanese Patent Application Laid-Open No. 358750-1992 discloses a method to provide adequate control of the purge control valve position when the fuel vapor is supplied to the suction system, wherein a target fuel vapor flow rate is compared with the detected fuel vapor flow rate according to the engine operating states. In this manner the position of the purge control valve is controlled according to the comparison result, and the purge control valve open/close speed is changed according to the detected fuel vapor concentration. Japanese Patent Application Laid-Open No. 245461-1990, on the other hand, discloses a method of gradually opening the purge control valve when the air-fuel ratio detected by the air-fuel ratio sensor is leaner than the target value.

Japanese Patent Application Laid-Open No. 131962-1987 discloses a method of controlling the air-fuel ratio when fuel vapor is supplied to the suction system, wherein purging is carried out in advance so that there is almost no change to air-fuel ratio. In this arrangement, a value of the compensation coefficient when purging is increased is predicted based on the compensation coefficient for air-fuel ratio control; and the prediction is used as the compensation coefficient when purging is actually increased, thereby restraining air-fuel ratio fluctuation, despite much purging. Finally, Japanese Patent Application Laid-Open No. 71536-1988, Japanese Patent Application Laid-Open No. 139941-1987, and Japanese Utility Application Model Laid-Open No. 190541-1988 disclose a method of increasing the gain of an air-fuel ratio feedback control arrangement during purging of the canister or within a specified time after purging is started.

Despite all efforts to improve purge control, fuel vapor cannot be fed to the internal combustion engine and combusted there if the purge pipe system is clogged or damaged. For example, U.S. Pat. No. 5,349,935 and Japanese Patent Application Laid-Open No. 272417-1993 disclose a method of applying pressure to part of the pipe system and detecting a pipe failure based on that pressure.

SUMMARY OF THE INVENTION

The object of the above-referenced Japanese Patent Application Laid-Open No. 234553-1992 is to provide accurate control by detecting the actual flow rate of fuel vapor. This approach, however, requires addition of a great number of sensors to determine the amount of air fed to the canister and the total amount of air and fuel vapor from the canister to the engine suction system, which increases the cost, and is not preferred.

According to Japanese Patent Application Laid-Open No. 358750-1992 (above), engine operating states make constant changes which can be momentarily substantial during a transition. This causes a rapid change of the target fuel vapor flow rate on the one hand. On the other hand, the purge flow rate changes more slowly than the engine operating states because of ventilation resistance in the small pipe connecting the canister and suction system, and because of the departure speed of the fuel vapor stored in the canister. Thus, deviation occurs temporarily between the target value and the detection value, resulting in failure to maintain accurate control.

According to this prior art, purge control valve opening speed is changed in strict conformity with the detected air-fuel ratio. Accordingly, even when almost no fuel vapor is generated, for example, the purge control valve is gradually opened in conformity with the detected air-fuel ratio. This results in an average increase of the time when the purge control valve is opened less. As a result, the average purge rate decreases and unwanted fuel vapor is stored in the canister.

Furthermore, even when a great deal of fuel vapor is generated, the purge control valve is opened gradually. During this time, fuel vapor is supplied to the internal combustion engine suction system regardless of the concentration, so that air-fuel ratio is overshot to the "rich" side. Also, the intended movement cannot be ensured if the waveform of the air-fuel ratio sensor is disturbed by high frequency because of poor distribution of air-fuel ratio among the cylinders.

Finally, in this arrangement the purge control valve is opened independently of the actual air-fuel ratio if the air-fuel ratio sensor fails, so that it indicates "lean" at all times, which clearly is undesirable.

In the arrangement according to Japanese Patent Application Laid-Open No. 131962-1987, operating states and residual amount of evaporator storage change constantly, so that an accurate control value cannot be ensured by predicting the coefficient in the case of greater purge rate based on the air-fuel ratio control amount in the case of smaller purge rate.

According to Japanese Patent Application Laid-Open No. 71536-1988, Japanese Patent Application Laid-Open No. 139941-1987, and Japanese Utility Application Model Laid-Open No. 190541-1988, the air-fuel ratio is increased independently of the amount of fuel vapor, which makes it difficult to ensure accurate control of the air-fuel ratio.

The arrangement in U.S. Pat. No. 5,349,935 and Japanese Patent Application Laid-Open No. 272417-1993 provides an effective proposal in that failure of the purge pipe system is detected by application of pressure. However, once the pressure state is reset to start supply of fuel vapor to the internal combustion engine, pressurized fuel vapor is suddenly injected into the internal combustion engine, resulting in deterioration of engine operability, as well as exhaust gas components. This problem is not addressed these prior arts.

Japanese Patent Application Laid-Open No. 272417-1993 discloses a simple and effective diagnostic device which uses a pressure switch to detect the pressure in the pressurized purge pipe system. However, correct diagnosis can be ensured only when this switch performs normally. For example, when the engine is stopped with pressure applied to the purge pipe system, and the purge control valve is also kept closed, normal pressure is released in the pipe system because of the high degree of air tightness. When an attempt is made to start the next diagnosis under this condition, the switch continues to indicate the high pressure due to residual positive pressure from the start. Accordingly, it becomes impossible to determine if the switch is operating properly or not, and normal diagnosis of the purge pipe system fails. Thus normal diagnostic procedure must be changed or residual positive pressure must be reduced in advance.

There also remains the additional question of when pressure should be applied. As described above, power is applied to the purge pipe system while the purge control valve is closed. If attempt is made to apply pressure when normal purge control is carried out, the purge valve must be closed, thus reducing the chance of purging fuel vapor stored in the canister.

When the purge control valve is actuated to diagnose the continuity of the purge pipe system based on the pressure therein, the purge control valve to which pressure was applied when the valve was closed becomes likely to stick because of the attached fuel vapor component; that is, the valve tends to fail to operate for some time after it is actuated. Also, when the purge pipe system is long, positive pressure tends to remain for some time because of flow resistance even if the purge valve starts normal operation. These problems will lead to the misjudgment that there is continuity for some time after the purge valve is actuated.

An object of the present invention is to provide an engine controller of the generic type described above, which accurately measures and controls the amount of fuel fed to the intake suction system of the internal combustion engine, so as to assure proper air-fuel ratio control.

Another object of the invention is to provide an engine controller which maintains operability of the engine and prevents degradation of the engine exhaust gas when fuel vapor is fed to the intake of the internal combustion engine.

Still another object of the invention is to provide an engine controller which facilitates purging of fuel vapor without adversely affecting engine operability or exhaust gas composition.

These and other objects and advantages are achieved by the engine control according to the invention, which according to a first embodiment comprises:

(a) a fuel tank;

(b) a canister to store fuel vapor;

(c) a purge pipe system leading from the fuel tank to the air suction system of the internal combustion engine via the canister;

(d) a purge control unit acting on the purge control valve in the purge pipe system and controlling the volume of fuel vapor to be supplied to the internal combustion engine;

(e) an internal combustion engine operating state detecting unit to detect the operating state of the internal combustion engine;

(f) an internal combustion engine control unit to control the internal combustion engine according to its operating state;

(g) an air-fuel ratio sensor to detect the air-fuel ratio of the mixed fuel gas supplied to said internal combustion engine; and (h) an air-fuel ratio control unit to control said air-fuel ratio to a target ratio based on the result of detecting the air-fuel ratio.

The internal combustion engine controller according to the invention also has a first calculation unit which uses the deviation from a control value of the air-fuel ratio control unit, to calculate the amount of fuel vapor stored in the canister, or the amount of the fuel supplied to the internal combustion engine, when the purge control valve is open and the internal combustion engine is at a specified operating state.

The above internal combustion engine controller may also use a second calculation unit to calculate the amount of fuel vapor stored in the canister or the amount of the fuel supplied to the internal combustion engine, in conformity with one of: a control value of the purge control unit, the internal combustion engine operating state detection value, and continuation of the internal combustion engine operating state, when the internal combustion engine is not at the specified operating state.

Another embodiment of the invention, comprises:

(a) a fuel tank;

(b) a canister to store fuel vapor;

(c) a purge pipe system leading from the fuel tank to the air suction system of the internal combustion engine via the canister;

(d) a purge control unit acting on the purge control valve in the purge pipe system and controlling the volume of fuel vapor to be supplied to the internal combustion engine;

(e) an internal combustion engine operating state detecting unit to detect the operating state of the internal combustion engine;

(f) an internal combustion engine control unit to control the internal combustion engine according to its operating state;

(g) an air-fuel ratio sensor to detect the air-fuel ratio of the mixed fuel gas supplied to the internal combustion engine; and (h) an air-fuel ratio control unit to control the air-fuel ratio to a target ratio based on the result of detecting the air-fuel ratio.

The internal combustion engine controller according to the invention has a rich/lean evaluation unit to distinguish between "richer" side or "leaner" side relative to the specified air-fuel ratio, and a purge pipe system pressuring means to increase the internal pressure supplied to the internal combustion engine by controlling the purge control valve in the direction of opening it through the purge control. A specified restriction or compensation is provided to the calculation results achieved by the first calculation unit or the amount of fuel vapor in conformity to the operation of the pressurizing means of the purge pipe system.

Still another embodiment of the invention comprises:

(a) a fuel tank;

(b) a canister to store fuel vapor;

(c) a purge pipe system leading from the fuel tank to the air suction system of the internal combustion engine via the canister;

(d) a purge control unit acting on the purge control valve in the purge pipe system and controlling the volume of fuel vapor to be supplied to the internal combustion engine;

(e) an internal combustion engine operating state detecting unit to detect the operating state of the internal combustion engine;

(f) an internal combustion engine control unit to control the internal combustion engine according to its operating state;

(g) an air-fuel ratio sensor to detect the air-fuel ratio of the mixed fuel gas supplied to the internal combustion engine;

(h) an air-fuel ratio control unit to control the air-fuel ratio to a target ratio based on the result of detecting the air-fuel ratio; and (i) a purge pipe system pressurizing unit to raise the internal pressure of the purge pipe system through part of the purge pipe system with the purge control valve kept closed.

In this embodiment, the internal combustion engine controller also has means to reduce the speed of opening the purge control valve or a means to increase the air-fuel ratio control response characteristic when the closing of the purge control valve is released after applying pressure to the purge pipe system.

Yet another embodiment of the invention comprises:

(a) a fuel tank;

(b) a canister to store fuel vapor;

(c) a purge pipe system leading from the fuel tank to the air suction system of the internal combustion engine via the canister;

(d) a purge control unit acting on the purge control valve in the purge pipe system and controlling the volume of fuel vapor to be supplied to the internal combustion engine;

(e) an internal combustion engine operating state detecting unit to detect the operating state of the internal combustion engine;

(f) an internal combustion engine control unit to control the internal combustion engine according to its operating state;

(g) an air-fuel ratio sensor to detect the air-fuel ratio of the mixed fuel gas supplied to the internal combustion engine;

(h) an air-fuel ratio control unit to control the air-fuel ratio to a target ratio based on the result of detecting the air-fuel ratio; and (i) a purge pipe system pressurizing unit to raise the internal pressure of the purge pipe system through part of the purge pipe system with the purge control valve kept closed.

In this embodiment, pressure is applied to the purge pipe system before the air-fuel ratio control starts.

In still another embodiment of the invention, the internal combustion engine controller comprises:

(a) a fuel tank;

(b) a canister to store fuel vapor;

(c) a purge pipe system leading from the fuel tank to the air suction system of the internal combustion engine via the canister;

(d) a purge control unit acting on the purge control valve in the purge pipe system and controlling the volume of fuel vapor to be supplied to the internal combustion engine;

(e) an internal combustion engine operating state detecting unit to detect the operating state of the internal combustion engine;

(f) an internal combustion engine control unit to control the internal combustion engine according to its operating state;

(g) an air-fuel ratio sensor to detect the air-fuel ratio of the mixed fuel gas supplied to the internal combustion engine;

(h) an air-fuel ratio control unit to control the air-fuel ratio to a target ratio based on the result of detecting the air-fuel ratio;

(i) a purge pipe system pressurizing unit to raise the internal pressure of the purge pipe system through part of the purge pipe system with the purge control valve kept closed;

(j) a pressure detecting unit to detect the pressure of the purge pipe system; and (k) a purge pipe system diagnostic unit to diagnose failure of the purge pipe system based on the result of pressure detection by the pressure detecting unit.

The purge pipe system diagnostic procedures in this embodiment are modified, or either diagnostic result or diagnosis history is set to a specified state, if the result of pressure detection indicates that the pressure has remained above the specified pressure since starting of the internal combustion engine.

According to yet another embodiment of the invention, the internal combustion engine controller comprises:

(a) a fuel tank;

(b) a canister to store fuel vapor;

(c) a purge pipe system leading from the fuel tank to the air suction system of the internal combustion engine via the canister;

(d) a purge control unit acting on the purge control valve in the purge pipe system and controlling the volume of fuel vapor to be supplied to the internal combustion engine;

(e) an internal combustion engine operating state detecting unit to detect the operating state of the internal combustion engine;

(f) an internal combustion engine control unit to control the internal combustion engine according to its operating state;

(g) an air-fuel ratio sensor to detect the air-fuel ratio of the mixed fuel gas supplied to the internal combustion engine;

(h) an air-fuel ratio control unit to control the air-fuel ratio to a target ratio based on the result of detecting the air-fuel ratio;

(i) a purge pipe system pressurizing unit to raise the internal pressure of the purge pipe system through part of the purge pipe system with the purge control valve kept closed;

(j) a pressure detecting unit to detect the pressure of the purge pipe system; and (k) a purge pipe system diagnostic unit to diagnose failure of the purge pipe system based on the result of pressure detection by the pressure detecting unit.

In this embodiment, the residual pressure is reduced by opening the closed purge control valve for a specified time, either before or after the internal combustion engine stops, or before the purge pipe system diagnosis procedure starts.

In another embodiment of the invention, the internal combustion engine controller comprises:

(a) a fuel tank;
(b) a canister to store fuel vapor;
(c) a purge pipe system leading from the fuel tank to the air suction system of the internal combustion engine via the canister;
(d) a purge control unit acting on the purge control valve in the purge pipe system and controlling the volume of fuel vapor to be supplied to the internal combustion engine;
(e) an internal combustion engine operating state detecting unit to detect the operating state of the internal combustion engine;
(f) an internal combustion engine control unit to control the internal combustion engine according to its operating state;
(g) an air-fuel ratio sensor to detect the air-fuel ratio of the mixed fuel gas supplied to the internal combustion engine;
(h) an air-fuel ratio control unit to control the air-fuel ratio to a target ratio based on the result of detecting the air-fuel ratio;
(i) a purge pipe system pressurizing unit to raise the internal pressure of the purge pipe system through part of the purge pipe system with the purge control valve kept closed;
(j) a pressure detecting unit to detect the pressure of the purge pipe system;
(k) a purge pipe system diagnostic unit to diagnose failure of the purge pipe system based on the result of pressure detection by the pressure detecting unit; and
(l) a continuity diagnostic unit to open the purge control valve for a specified time and diagnose the continuity of the purge pipe system including the purge control valve on the basis of pressure of the purge pipe system after the valve is opened from the closed position.

In this embodiment, the continuity of the purge pipe system is diagnosed by the continuity diagnostic unit upon expiration of a specified period of time after purge control valve is driven.

The following describes the operations and effects of the invention:

(1) The present invention provides an internal combustion engine controller comprising:
(a) a fuel tank;
(b) a canister to store fuel vapor;
(c) a purge pipe system leading from the fuel tank to the air suction system of the internal combustion engine via the canister;
(d) a purge control unit acting on the purge control valve in the purge pipe system and controlling the volume of fuel vapor to be supplied to the internal combustion engine;
(e) an internal combustion engine operating state detecting unit to detect the operating state of the internal combustion engine;
(f) an internal combustion engine control unit to control the internal combustion engine according to its operating state;
(g) an air-fuel ratio sensor to detect the air-fuel ratio of the mixed fuel gas supplied to the internal combustion engine; and
(h) an air-fuel ratio control unit to control the air-fuel ratio to a target ratio based on the result of detecting the air-fuel ratio.

According to the invention, the internal combustion engine controller further comprises a first calculation unit which uses the deviation from a control value of the air-fuel ratio control unit, to calculate the amount of fuel vapor stored in the canister, or the amount of the fuel supplied to the internal combustion engine, when the purge control valve is open and the internal combustion engine is at a specified operating state.

The invention uses the control value of the air-fuel ratio control to calculate the amount of fuel vapor stored in the canister, or the amount of the fuel supplied to the internal combustion engine from the canister, because the control value of the air-fuel ratio control unit corresponds to the concentration of the purged fuel vapor. This manner of calculation can only be used, however, when the internal combustion engine is operating in the steady state. Moreover, the air-fuel ratio control value must have been adjusted to the lean side to ensure the control amount of the air-fuel ratio control unit will not be affected by the engine variation and secular change.

(2) The invention also provides a second calculation unit which calculates the amount of fuel vapor stored in the canister or the amount of the fuel supplied to the internal combustion engine, based on at least one of the following: the control value of the purge control unit, the internal combustion engine operating state detection value and continuation of the internal combustion engine operating state. This manner of calculation is utilized whenever the internal combustion engine is not in the specified operating state (steady state).

As mentioned above, the internal combustion engine must be operating in a steady state in order to calculate the stored amount of fuel vapor or the supplied amount of the fuel using the control value of the air-fuel ratio control. However, it is also apparent that fuel vapor is generated and purged in other states; thus, accurate calculation of the stored amount of fuel vapor or the supplied amount of the fuel is impossible without continued calculation of the amount of fuel vapor during this period. In cases where calculation using the control value of the air-fuel ratio control unit is not appropriate, means other than the control value are used for calculation.

Where calculation using the air-fuel ratio control value is not appropriate, it is preferred to determine the amount of fuel vapor by estimation based on control signals or the operating state parameters of the internal combustion engine. When there is a great amount of fuel to be controlled by the purge control and a great amount to be purged, for example, there will be an increase in the amount of fuel sucked into the internal combustion engine, whereas the amount stored in the canister tends to decrease. Even when the amount to be purged is constant, the actual amount of purge varies according to the negative pressure applied to the purge control valve, which itself differs according to the load of the internal combustion engine, amount of sucked air, speed, and the position of the throttle valve. Accordingly, calculation is made by the internal combustion engine operating state detecting means.

On the other hand, continued operation of the internal combustion engine at a high temperature and load tends to cause the amount of the generated fuel vapor to increase. Therefore, the calculation must be based on the conditions in which the internal combustion engine is operated.

(3) The result of the first calculation is used as the initial value for the second calculation by the second calculation unit.

When engine has shifted form a first operating state, in which calculation using the control value of the air-fuel ratio control unit is appropriate, to a second operating state in which it is not, and back to the first state again, the calculation based on the control value of the air-fuel ratio control unit in the steady state is the most reliable. Thus, it is desirable to reset the calculation result to that value, or to compensate for it. Furthermore, when the engine has shifted to the second state (in which calculation using the control value of the air-fuel ratio control unit is not appropriate), it is important to determine an appropriate starting value for calculation of the fuel vapor amount. Since the value obtained by applying the control signal of the air-fuel ratio control unit to the steady state is the most reliable, using it as an initial value enhances calculation accuracy.

(4) Whenever the operating state shifts to the specified (e.g., steady state) operating state during a period when the calculation is being performed by the second calculation unit, and a calculation is made by the first calculation unit, the result of the second calculation is replaced by the result of calculation by the first calculation unit implemented after the shift. When there is such a sudden shifting to the specified operating state during the second calculation, such replacement ensures more stable and accurate values than the results of the first calculation under the specified operation (5) A single value for the fuel vapor amount must be is derived from the results of the first and second calculations.

Calculation using the control value of the air-fuel ratio control unit may or may not be appropriate. Moreover, it is clearly desirable to get the results by calculation in a proper way; and the value to be calculated is but a single quantity: either the stored amount of fuel vapor or the supplied amount of fuel. That is, the result of the first and second calculations must not be handled as separate items, but must be used to derive one amount of fuel vapor. This technique permits accurate calculation of the amount of fuel vapor, independently of the operating state.

(6) The operation range of the internal combustion engine is manifested by at least the engine load, engine speed and throttle position, and each of the calculation unit is used for each of a plurality of operation ranges, thereby obtaining at least the result of calculations corresponding to each of said operation ranges or the amount of fuel vapor.

The amount of the fuel vapor supplied to the internal combustion engine from the canister is affected by the balance between the negative pressure generated by the internal combustion engine suction system and the positive pressure generated by the fuel tank. When a comparatively large negative pressure is applied to the suction system, the amount sucked by the negative pressure is predominant. On the other hand, in the opposite circumstances, the amount pushed out by the positive pressure of fuel vapor is predominant. There is no agreement necessarily between the characteristics of the two circumstances; and the problem arises that the amount of the supplied fuel vapor has poor correlation in the above mentioned ranges, so that one and the same calculation formula cannot be used for both. Accordingly, while the item to be calculated is, as stated above, a single item (the stored amount of fuel vapor or the supplied amount of the fuel), accurate calculation conforming to operation range can be obtained by dividing the operation range into several portions and making a separate calculation for each portion.

(7) This calculation is performed for the respective portions of the operation range, or when the amount of fuel vapor was obtained, and the amount of stored fuel vapor or the amount of supplied fuel vapor is compensated corresponding to the operation range other than the range according to these values.

In the case of operations which are unevenly distributed among operation ranges (for example, in the case of a long-distance drive almost without idling), it is almost impossible to calculate a result corresponding to the idling range. If idling occurs suddenly in such cases, a discrepancy arises between the stored previous result of calculation and actual condition of the fuel vapor; thus accurate air-fuel ratio control cannot be ensured. To solve this problem, compensation is made for the stored amount of fuel vapor or supplied amount of fuel vapor in other than the operation range where calculation is currently made, based on the value currently under calculation. This provides an accurate amount of fuel vapor even when the operation range is shifted after continued operation which is distributed unevenly with respect to a particular range.

(8) A portion of the non-volatile memory is reserved for each of the plurality of operation ranges; and the result of the calculation made for each of the operation ranges, or the amount of fuel vapor, is stored therein. The first and second calculations are performed using the read-out value of the stored amount for the operation range in question, thereby obtaining the amount of fuel vapor.

The amount of the fuel vapor stored in the canister is maintained even when the engine is stopped, so that the amount of fuel vapor calculated above must be maintained when the system power is turned off. As stated above, however, the amount of fuel vapor is calculated and maintained for each operation range. At the same time, an accurate amount of fuel vapor in restarting after the engine stopped is provided, by subsequent calculation of the stored value corresponding to the current operation range.

(9) The internal combustion engine controller comprises a calculating function failure detecting unit to detect failure of the calculation unit, a calculating function detecting unit to show that the calculation unit has recovered from such failure and is ready to function, and a surrounding condition detecting unit to estimate or detect the environmental conditions of the fuel tank, canister and purge pipe system in the event of such calculating function failure. The internal combustion engine controller sets at least one of the storage value, the calculated value and the amount of fuel vapor to the specified value, or compensates for it based on the environmental conditions in the calculating function failure at the start of said calculating function.

As mentioned above, the amount of fuel vapor stored in the canister is maintained even after the engine is stopped. Fuel vapor may be generated depending on the temperature and atmospheric pressure and will be filled and stored in the fuel tank. Accordingly, while the system power is turned off, changes of environmental conditions cannot be accurately followed merely by storing the amount of fuel vapor calculated as mentioned above. To solve this problem, the calculated value for the amount of fuel vapor is set to the specified value, or is compensated according to the state during the power off period, which can be estimated from the time when the power is turned off or the water and atmospheric temperature after restart. This provides a more accurate amount of fuel vapor in conformity to environmental conditions when the engine is stopped.

(10) Furthermore, the internal combustion engine controller comprises a sensor failure diagnostic unit to detect any failure of the internal combustion engine operation detecting unit or the air-fuel ratio detecting unit; and a control limit arrival detecting unit to detect that either the internal combustion engine control unit or the air-fuel ratio control unit has reached the limit of the controllable range. The internal combustion engine controller stops the calculation unit when it has detected that either the sensor failure diagnostic unit or the control limit arrival detecting unit has failed or has reached the control limit, and sets the amount of fuel vapor to the separately specified value.

When the amount of fuel vapor is calculated, the air-fuel ratio control value or internal combustion engine operating state detection value are used as mentioned above. Accurate calculation of the amount of fuel vapor becomes impossible if the sensor to detect them or the actuator to control the internal combustion engine is faulty, or if they are beyond control because the control limit has been reached for some reason. To solve this problem, fail-safe measures are provided, for example, by stopping the calculation and setting the amount of fuel vapor to a specified value.

(11) The internal combustion engine controller comprises a variation control unit to keep variations in the calculation result (the calculated amount of fuel vapor) within a specified variation range, when using the first calculation unit or when obtaining the amount of fuel vapor.

Fuel vapor supplied to the engine intake suction system comprises a mixture of fresh air from the canister drain, fuel vapor stored in the canister and fuel vapor generated in the fuel tank. When there is a sudden change of negative pressure in the suction system, the amount of fresh air changes suddenly, resulting in a sudden change of fuel concentration. However, there is no sudden change in the amount of actually stored fuel vapor, and a discrepancy will thus occur between the calculated value and the actual amount of fuel vapor, due to such variations in concentration of fuel vapor. In the event a sudden load change over a certain degree as stated above, measures can be taken by momentary interruption of calculation or similar means. In the event of lesser load changes, it is difficult to prevent such a discrepancy. Accordingly, to minimize this discrepancy, sudden changes in calculated value must be controlled, so that a value conforming to the actual amount of fuel vapor can be obtained.

(12) Variations controlled by the variation control unit are determined by calculation factor(s) comprising any of the physical parameters affecting the first and second calculation results, the amount of fuel vapor, the fuel engine operations, the control value from the air-fuel ratio control unit, the control value from the purge control unit, and the amount of fuel vapor generated.

As stated above, changes in the amount of fuel vapor occur slowly in relation to the changes in the amount of fresh air form the canister drain. However, the rate at which detached fuel vapor is adsorbed in the canister tends to increase with the adsorbed amount, so it is necessary to change and control the calculation value or variation range in the amount of fuel vapor in conformity with the residual amount of the fuel vapor, as required. Furthermore, the amount to be purged increases with the negative pressure applied to the canister control valve or purge control amount, as stated above. The amount of fuel vapor remaining in the canister purge pipe system depends on the physical parameters which affect the generation of fuel vapor, including atmospheric pressure, air temperature, cooling water temperature, fuel temperature, fuel properties and the pressure inside the passage of fuel vapor leading from the fuel tank to the internal combustion engine suction system via the canister. It is also necessary to control the variation range in conformity to this, whenever required. Furthermore, since the control value of the air-fuel ratio control corresponds to the amount of fuel vapor, a substantial amount of fuel vapor is determined to have escaped from the canister if the control value of the air-fuel ratio control unit exhibits a large change with respect to the canister control signal. This requires change of the variation range in conformity with the control value of the air-fuel ratio control unit.

Thus, a value corresponding to actual amount of fuel vapor can be obtained by changing and controlling the variation range based on the deviations of the amount of adsorption, various physical parameters and the air-fuel ratio control value, from the fixed values.

(13) The internal combustion engine controller has a purge control unit to raise the internal pressure of the purge pipe system with the purge control valve kept closed, and restricts or compensates the calculation results by the first calculation unit, or the amount of fuel vapor, in conformity with the operation of the pressurizing unit of the purge pipe system.

The amount of fuel vapor generated in the fuel tank is affected by positive pressure in a system where leakage from the purge pipe system and function are diagnosed from the positive pressure condition, with the purge control valve closed, and positive pressure applied to the purge pipe system. Thus, an accurate calculation value cannot be obtained by calculation of the amount of fuel vapor, as in the normal case. This problem is solved by restricting the calculation of the amount of fuel vapor, or by compensating in conformity with the application of positive pressure.

(14) Furthermore, it is preferred that the internal combustion engine controller has a unit to detect at least one of the environmental condition parameters for the fuel tank, canister and purge pipe system, as well as fuel condition parameters, and restrict the calculation unit in conformity with the detection, or compensates for at least one of said first and second calculation results, or the amount of fuel vapor.

As mentioned above, when calculation using the control value of the air-fuel ratio control unit is not appropriate, it is preferred that the operating state detection value of the internal combustion engine be used for calculation. It is thus preferred to have a means to detect, directly or indirectly, the environmental parameters which affect the generation of fuel vapor, including atmospheric pressure, air temperature, cooling water temperature, fuel temperature, fuel properties and the pressure inside the fuel line leading from the fuel tank to the internal combustion engine suction system via the canister, as well as fuel state parameters including fuel properties and residual amount of fuel. It is also preferred either to stop the calculation or to compensate for the calculated value when it is inappropriate to calculate the amount of fuel vapor according to these detection results, in order to prevent incorrect values from being obtained.

(15) Accurate air-fuel ratio control is realized by adjusting the control characteristics of the purge control valve speed, purge control valve position or air-fuel ratio control speed, in accordance with the first and second calculation results, or the amount of fuel vapor.

As mentioned above, the first and second calculation values, or the amount of fuel vapor, shows the amount of fuel vapor stored in the canister or the amount of fuel vapor supplied to the internal combustion engine from the canister. Although these quantities affect the ratio between air and fuel supplied to the internal combustion engine, since it is not the fuel vapor itself which is measured by the sensor or similar device, it is difficult to ensure accurate control of the air-fuel ratio of the mixed gas which is ultimately supplied to the engine. Accordingly, it is intended to calculate the correct amount of fuel vapor in the manner stated above and to change the control characteristics to conform to the amount of fuel vapor where the purge control and air-fuel ratio control speed are calculated, thereby ensuring more accurate air-fuel ratio control.

(16) The internal combustion engine controller has a reduced speed fuel shutoff device that shuts off fuel supply to the internal combustion engine at a specified time after detecting a speed reduction, and determines whether or not the purge control valve should be set to a purge shutoff condition during the specified period of time, according to either of the first and second calculation results or the amount of fuel vapor; and a means to set the purge control value to the purge shutoff condition according to such determination.

When the supply of fuel to the internal combustion engine is stopped during a speed reduction, such sudden stopping of the fuel supply will cause sudden torque change, which results in shocks. To prevent this problem, fuel supply to all the cylinders is generally stopped after a certain allowed period. That is, if the supply of fuel vapor from only the purge control valve is stopped during the allowed period, changes in air-fuel ratio are likely to occur. Accordingly, it is preferred to maintain the air-fuel ratio control, with the purge control valve kept closed. When a large amount of fuel vapor is stored in the canister, excessive fuel vapor will be supplied to the system where purge is carried out by the negative pressure of the suction pipe. This in turn will aggravate the exhaust gas against expectation. To solve this problem, whether the purge control valve is to be closed or not during the allowance period is determined according to the amount of fuel vapor; and purging is then carried out.

(17) The present invention provides another form of the internal combustion engine controller comprising:
 (a) a fuel tank;
 (b) a canister to store fuel vapor;
 (c) a purge pipe system leading from the fuel tank to the air suction system of the internal combustion engine via the canister;
 (d) a purge control unit acting on the purge control valve in the purge pipe system and controlling the volume of fuel vapor to be supplied to the internal combustion engine;
 (e) an internal combustion engine operating state detecting unit to detect the operating state of the internal combustion engine;
 (f) an internal combustion engine control unit to control the internal combustion engine according to its operating state;
 (g) an air-fuel ratio sensor to detect the air-fuel ratio of the mixed fuel gas supplied to the internal combustion engine;
 (h) an air-fuel ratio control unit to control the air-fuel ratio to a target ratio based on the result of detecting the air-fuel ratio; and
 (i) a rich/lean evaluation unit to distinguish between "richer" side or "leaner" side relative the specified air-fuel ratio.

In this embodiment, the purge control value is increased by a specified range when the amount of fuel vapor to be supplied to said internal combustion engine increases, and when the selection of the rich/lean evaluation unit has shifted from "richer" to "leaner", while maintaining the control amount otherwise, by controlling the purge control valve in the direction of opening it, through the purge control unit.

When the purge valve is controlled in the direction of opening it, it is preferred to open the valve gradually, when air-fuel ratio control can follow it. The present invention provides a specific method for this. That is, if the air-fuel ratio sensor indicates "lean", it can be concluded that air-fuel ratio control can follow. If the valve is adjusted toward the open position, while the air-fuel ratio sensor indicates "lean", the purge control valve position will be opened independently of the actual air-fuel ratio if the air-fuel ratio sensor fails in the mode indicating "lean". To solve this problem, the purge control valve is opened slightly only when the air-fuel ratio sensor has shifted from "rich" to "lean". This prevents excessive fuel vapor from being supplied to the internal combustion engine.

(18) The rich/lean evaluation unit evaluates the detection by the air-fuel ratio detecting unit, based on the signal filtered through a low-pass filter.

Excessive valve opening will result if control is performed as mentioned above, using that signal when the output of the air-fuel ratio sensor is disturbed by a high frequency due to variations of supplied mixed gas among the cylinders. To solve this problem, the output of the air-fuel ratio sensor is filtered by the low-pass filter and the resulting valve is used to avoid excessive fuel supply even when the output of the air-fuel ratio sensor is disturbed by high frequency.

(19) The internal combustion engine has multiple cylinders which may be divided in groups, each of which is provided with an air-fuel ratio sensor. The internal combustion controller has:
 (a) an air-fuel ratio control for each group to control to the target air-fuel ratio of the mixed gas supplied to the internal combustion engine for each group based on the detected air-fuel ratio;
 (b) a low pass filter to filter the output of the air-fuel ratio sensor for each group;
 (c) a rich/lean evaluation unit to determine whether the post-filtering air-fuel ratio sensor value obtained by the filter is "richer" or "leaner" than each specified air-fuel ratio; and
 (d) a unit which increases the purge control value by a specified range, when the output of the rich/lean evaluation unit has shifted from "richer" to "leaner", and maintains the purge control amount otherwise.

It is preferred that a shift from "richer" to "leaner" for each group is referenced alternately.

When the purge control valve is opened as above in a system where air-fuel ratio sensors are laid out in respective banks for a V-shaped engine, and air-fuel ratio control is performed separately, there is only one purge control valve, even if there are two or more air-fuel ratio sensors. Thus, the valve is adjusted toward the open position by mutual detection of a shift from "rich" to "lean" of air-fuel ratio sensor signals. This method provides a more accurate air-fuel ratio for each bank. It goes without saying, of course, that the air-fuel ratio sensor signal is preferred to be filtered through a low-pass filter.

(20) Furthermore, the internal combustion engine controller has an air-fuel ratio sensor failure diagnostic unit to determine whether or not the air-fuel ratio sensor for each group is faulty. If the air-fuel ratio sensor failure diagnostic unit has detected failure in any of the air-fuel ratio sensors, a shift from "richer" to "leaner" is detected using the detection results of the normal air-fuel ratio sensor, filtered by said low-pass filter, and the purge control signal is increased in accordance with the shift.

When the purge control valve is adjusted toward the open position by referencing of the air-fuel ratio sensors with each other in the V-shaped engine as stated above, the normal air-fuel ratio sensor is used to control the valve to the open position in the event that one of the air-fuel ratio sensors fails. This method provides purge control almost the same as normal purge control.

(21) If the air-fuel ratio sensor failure diagnostic unit has detected failure in either or both of the groups of air-fuel ratio sensors (for the respective banks of the V-shaped engine), the group-wise air-fuel ratio control by the group with the failure is stopped, and the control value of the purge control unit is set to a predetermined value, or a limit value is set to the control value.

When the air-fuel ratio sensor has failed, the air-fuel ratio cannot be controlled, so the operation is stopped. If the purge control valve is opened when another air-fuel ratio sensor is broken as mentioned above, the air-fuel ratio of the bank on the side where air-fuel ratio control is stopped cannot be controlled, and excessive concentration in air-fuel ratio will occur. In this case, it is necessary to limit the opening of the purge control valve to avoid such excessive concentration.

Furthermore, when both air-fuel ratio sensors are broken, it is preferred that the following measures be taken: as stated above, compensation and control can be performed based on the signal of another air-fuel ratio sensor when one of the air-fuel ratio sensors is faulty. Control is not possible, however, if both air-fuel ratio sensors are broken; hence, easy opening of the purge control valve is not possible. However, if the purge control valve is left open, fuel vapor will not be completely burnt by the internal combustion engine, and the canister will be filled up, resulting in fuel vapor being discharged into the atmosphere, which must be avoided. To solve this problem, either the position of the purge control valve is set to a specified value such that excessive concentration in air-fuel ratio does not occur, or an upper limit is imposed on the valve opening.

(22) It is necessary that the internal combustion engine controller obtain the amount of fuel vapor determined by the first or second calculation, from which it can detect a shift from "richer" to "leaner". The range of increase in the purge control signal in conformity to such shift can then be changed and controlled according to at least any one of the first or second calculation result, the amount of fuel vapor and the control value of the air-fuel ratio control unit.

When the purge control valve is adjusted toward the open position, it is preferred to open it gradually after the air-fuel ratio control has followed it, as mentioned above. When the air-fuel ratio control speed is sufficient to permit the follow-up with respect to the amount of fuel vapor to be purged, it is preferred to open the purge control valve more quickly to a more open position, which prevents the fuel vapor from remaining in the purge pipe system.

(23) The purge control valve is adjusted toward the open position by the purge control unit, and characteristics of the air-fuel ratio control unit are changed and controlled according to the first or second calculation result or the amount of fuel vapor, when the amount of fuel vapor supplied to said internal combustion engine is increased.

When it is considered that the air-fuel ratio control speed with respect to the amount of fuel vapor to be purged can be followed up sufficiently based on the purge control valve control signal, the first or second calculation results, or the amount of fuel vapor, then the air-fuel ratio control speed is increased to ensure there will be no problem by opening the purge control valve more quickly to a more open position, thereby improving follow-up characteristics. This will ensure efficient purging of fuel vapor, and prevent fuel vapor from remaining in the purge pipe system.

(24) The present invention provides another form of the internal combustion engine controller comprising:
(a) a fuel tank;
(b) a canister to store fuel vapor;
(c) a purge pipe system leading from the fuel tank to the air suction system of the internal combustion engine via the canister;
(d) a purge control unit acting on the purge control valve in the purge pipe system and controlling the volume of fuel vapor to be supplied to the internal combustion engine;
(e) an internal combustion engine operating state detecting unit to detect the operating state of the internal combustion engine;
(f) an internal combustion engine control unit to control the internal combustion engine according to its operating state;
(g) an air-fuel ratio sensor to detect the air-fuel ratio of the mixed fuel gas supplied to the internal combustion engine;
(h) an air-fuel ratio control unit to control the air-fuel ratio to a target ratio based on the result of detecting the air-fuel ratio; and
(i) a purge pipe system pressurizing unit to raise the internal pressure of the purge pipe system with the purge control valve kept closed; and
(j) a device to reduce the speed of opening the purge control valve or to increase the air-fuel ratio control response characteristic when the closing of the purge control valve is released after applying pressure to the purge pipe system.

In an internal combustion engine controller having a system where diagnosis is performed with the purge control valve kept open and pressure applied to the purge pipe system, the present invention provides a specific technique for controlling changes in air-fuel ratio when the purge control valve is opened. That is, when the purge control valve is opened after pressure has been applied, fuel vapor is pushed out into the suction system of the internal combustion engine by the applied positive pressure. Normal control procedures, however, cannot control the air-fuel ratio, thus raising a problem of deteriorating exhaust gas composition. To solve this problem, when the purge control valve is opened after application of the pressure to the purge pipe system, compensation is made so that valve opening speed is reduced or air-fuel ratio control speed is increased, thereby ensuring that air-fuel ratio control can follow the increase in fuel vapor.

(25) The present invention provides another form of the internal combustion engine controller comprising:
(a) a fuel tank;
(b) a canister to store fuel vapor;
(c) a purge pipe system leading from the fuel tank to the air suction system of the internal combustion engine via the canister;
(d) a purge control unit acting on the purge control valve in the purge pipe system and controlling the volume of fuel vapor to be supplied to the internal combustion engine;
(e) an internal combustion engine operating state detecting unit to detect the operating state of the internal combustion engine;
(f) an internal combustion engine control unit to control the internal combustion engine according to its operating state;

(g) an air-fuel ratio sensor to detect the air-fuel ratio of the mixed fuel gas supplied to the internal combustion engine;

(h) an air-fuel ratio control unit to control said air-fuel ratio to a target ratio based on the result of detecting the air-fuel ratio; and (i) a purge pipe system pressurizing unit to raise the internal pressure of the purge pipe system with the purge control valve kept closed.

In this embodiment of the internal combustion engine controller, pressure is applied to the purge pipe system before the air-fuel ratio control starts.

(26) Preferably, the internal combustion engine controller further comprises a secondary air feed device to introduce fresh air into the exhaust system, and part or all of the time when pressure is applied to the purge pipe system falls within the period of time during which the secondary air feed device is operating.

The purge pipe system is opened when the purge control valve is kept closed as mentioned above. Thus, if an attempt is made to apply pressure during normal purge control, the purge control valve must be closed for that purpose, which would reduce the chance of purging the fuel vapor stored in the canister, and must therefore be avoided. As stated above, purge control is closely related to air-fuel ratio control, and does not operate basically when air-fuel ratio control is not working. That is, purge control is disabled before air-fuel ratio control starts, and the purge control valve is kept closed. Accordingly, the purge control valve opening time is saved, and fuel vapor purging efficiency is improved by application of pressure to the purge pipe system before the air-fuel ratio control starts, or when the secondary air feed device is working.

(27) The present invention provides an internal combustion engine controller comprising:

(a) a fuel tank;

(b) a canister to store fuel vapor;

(c) a purge pipe system leading from the fuel tank to the air suction system of the internal combustion engine via the canister;

(d) a purge control unit acting on the purge control valve in the purge pipe system and controlling the volume of fuel vapor to be supplied to the internal combustion engine;

(e) an internal combustion engine operating state detecting unit to detect the operating state of the internal combustion engine;

(f) an internal combustion engine control unit to control the internal combustion engine according to its operating state;

(g) an air-fuel ratio sensor to detect the air-fuel ratio of the mixed fuel gas supplied to the internal combustion engine;

(h) an air-fuel ratio control unit to control the air-fuel ratio to a target ratio based on the result of detecting the air-fuel ratio;

(i) a purge pipe system pressurizing unit to raise the internal pressure of the purge pipe system with the purge control valve kept closed;

(j) a pressure detecting unit to detect the pressure in the purge pipe system; and (k) a purge pipe system diagnostic unit to diagnose failure of the purge pipe system according to the result of pressure detection by the pressure detecting unit.

In this embodiment, if the result of pressure detection indicates that the pressure has remained above a specified level since the start of the internal combustion engine, the purge pipe system diagnostic procedures are modified, or either diagnostic result or diagnosis history is set to a specified state.

A pressure detector is required in a system in which diagnosis is performed by pressure applied to the purge pipe system. When a pressure switch is used for this purpose, for example, its operation will be affected by residual pressure. So if the detector already indicates the high pressure side when the diagnosis is started, there is no way to know whether the detector itself is broken, resulting in disabled diagnosis of the purge pipe system. In such a case, diagnostic error or missing diagnosis can be prevented by changing the purge pipe system diagnostic procedure and setting either diagnostic result or diagnosis history to the specified state (for example, leaving the current diagnosis to the next diagnosis, without implementing current diagnosis, assuming that there is no trouble currently in the purge pipe system).

(28) The present invention provides another form of the internal combustion engine controller which comprising:

(a) a fuel tank;

(b) a canister to store fuel vapor;

(c) a purge pipe system leading from the fuel tank to the air suction system of the internal combustion engine via the canister;

(d) a purge control unit acting on the purge control valve in the purge pipe system and controlling the volume of fuel vapor to be supplied to the internal combustion engine;

(e) an internal combustion engine operating state detecting unit to detect the operating state of the internal combustion engine;

(f) an internal combustion engine control unit to control the internal combustion engine according to its operating state;

(g) an air-fuel ratio sensor to detect the air-fuel ratio of the mixed fuel gas supplied to the internal combustion engine;

(h) an air-fuel ratio control unit to control said air-fuel ratio to a target ratio based on the result of detecting the air-fuel ratio;

(i) a purge pipe system pressurizing unit to raise the internal pressure of the purge pipe system with the purge control valve kept closed;

(j) a pressure detecting unit to detect the pressure in the purge pipe system; and (k) a purge pipe system diagnostic unit to diagnose failure of the purge pipe system according to the result of pressure detection by the pressure detecting unit.

In this embodiment, residual pressure is reduced by opening the purge control valve for a specified time either before or after the internal combustion engine stops, or before the purge pipe system diagnosis procedure starts.

As mentioned above, positive pressure remaining before the start of diagnosis will adversely affect the result of a diagnosis preformed by pressure applied to the purge pipe system. To reduce the pressure before diagnosis starts, if the purge control valve is closed, it is kept opened for a specified time, thereby reducing residual pressure.

(29) The present invention provides another form of the internal combustion engine controller comprising:

(a) a fuel tank;

(b) a canister to store fuel vapor;

(c) a purge pipe system leading from the fuel tank to the air suction system of the internal combustion engine via the canister;

(d) a purge control unit acting on the purge control valve in the purge pipe system and controlling the volume of fuel vapor to be supplied to the internal combustion engine;

(e) an internal combustion engine operating state detecting unit to detect the operating state of the internal combustion engine;

(f) an internal combustion engine control unit to control the internal combustion engine according to its operating state;

(g) an air-fuel ratio sensor to detect the air-fuel ratio of the mixed fuel gas supplied to the internal combustion engine;

(h) an air-fuel ratio control unit to control the air-fuel ratio to a target ratio based on the result of detecting the air-fuel ratio;

(i) a purge pipe system pressurizing unit to raise the internal pressure of the purge pipe system with the purge control valve kept closed;

(j) a pressure detecting unit to detect the pressure in the purge pipe system;

(k) a purge pipe system diagnostic unit to diagnose failure of the purge pipe system according to the result of pressure detection by the pressure detecting unit; and (l) a continuity diagnostic unit to open the purge control valve for a specified time and to diagnose the continuity of the purge pipe system, including the purge control valve, based on the pressure in the purge pipe system after said valve is opened from the closed position.

Continuity of the purge pipe system is diagnosed by the continuity diagnostic unit a specified period of time after the purge control valve is driven.

As mentioned above, when the continuity of the purge pipe system is diagnosed based on the pressure in the purge pipe system by energizing the purge control valve, error can easily occur because of sticking of the purge control valve so that positive pressure remains for some time after it has been energized. To solve this problem, continuity is disabled in the purge pipe system for a specified time after it has been energized.

The present invention allows accurate calculation of the amount of fuel vapor in the operating range determined by the operating conditions of the internal combustion engine, the engine load, speed and the throttle position. Furthermore, follow-up of air-fuel ratio control is ensured by control of the purge control valve based on a rich/lean evaluation of air-fuel ratio, which makes it possible to obtain characteristics of the optimum purge control, internal combustion engine control and air-fuel ratio control. When a purge pipe system failure is diagnosed by means of pressure applied to the purge pipe system, the invention also enables diagnosis without deteriorating the controllability of the internal combustion engine, thereby ensuring control of the internal combustion engine with minimized changes in air-fuel ratio. At the same time, it provides reliable and accurate detection of purge pipe system failures.

Other objects, advantages and novel features of the present invention will become apparent from the following detailed description of the invention when considered in conjunction with the accompanying drawings.

DETAILED DESCRIPTION OF THE PREFERRED EMBODIMENT

The following is a detailed description of the present invention with reference to embodiments.

Figure 1:
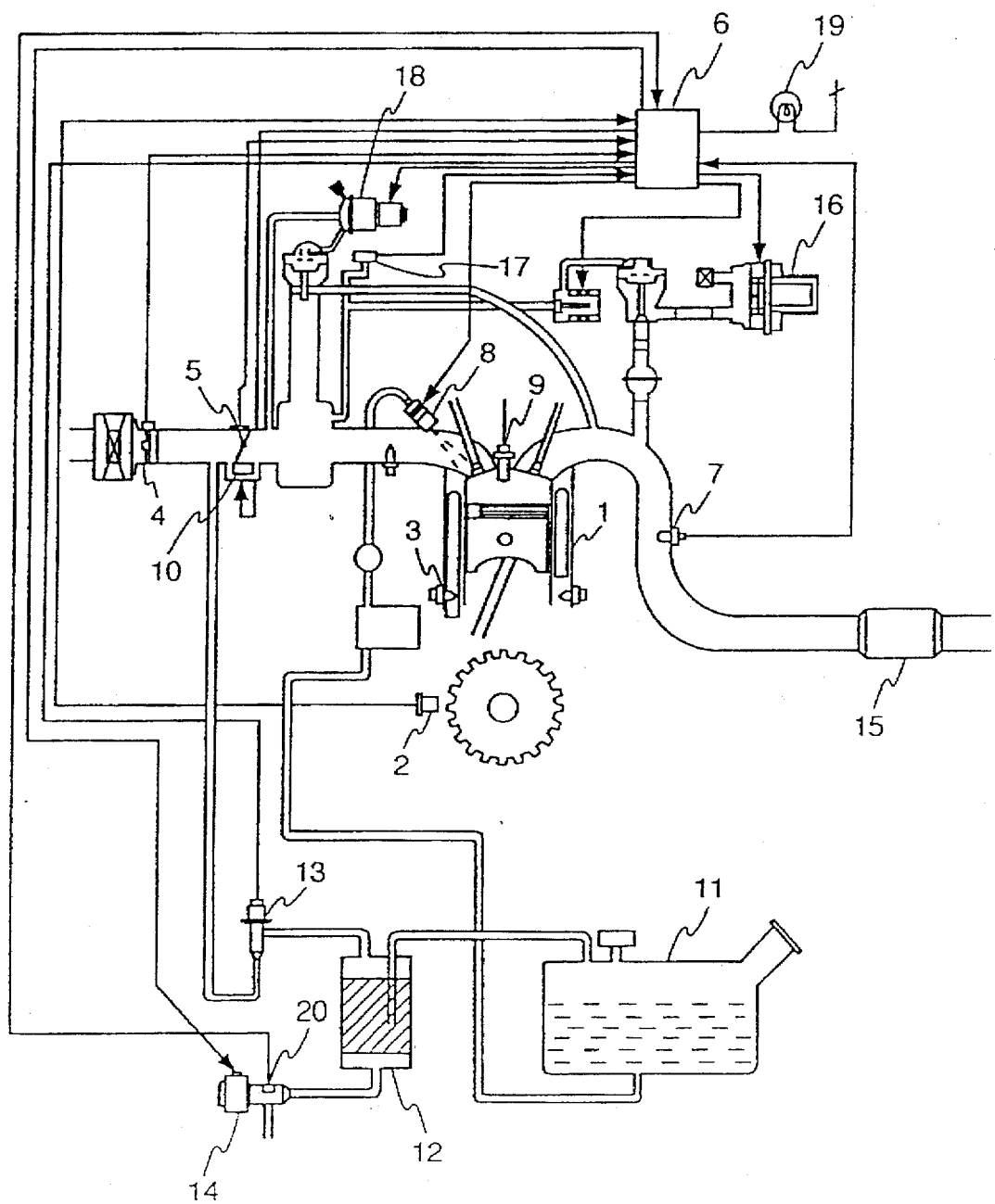
FIG. 1 is a drawing representing the system configuration of one embodiment according to the present invention.

FIG. 1 shows an embodiment of the present invention. The operating conditions of the internal combustion engine 1 are detected by the speed sensor 2, coolant temperature sensor 3, air intake volume sensor 4, throttle position sensor 5, and the air-fuel ratio sensor 7. These detected results are input into the controller 6 which controls the 10 fuel injector 8, firing coil (not illustrated), ignition plug 9 and air flow control valve during idle time, accordingly, so that the operation of the internal combustion engine is controlled. Fuel vapor generated in the fuel tank 11 is stored in the canister 12, and is fed to the suction system of the internal combustion engine 1 via the purge control valve 13 under the control of the controller 6. Furthermore, positive pressure is applied to the purge pipe system by the positive pressure application device 14 under the control of the controller 6. The applied pressure is detected by the pressure detector 20, and that information is sent to controller 6.

Figure 18:
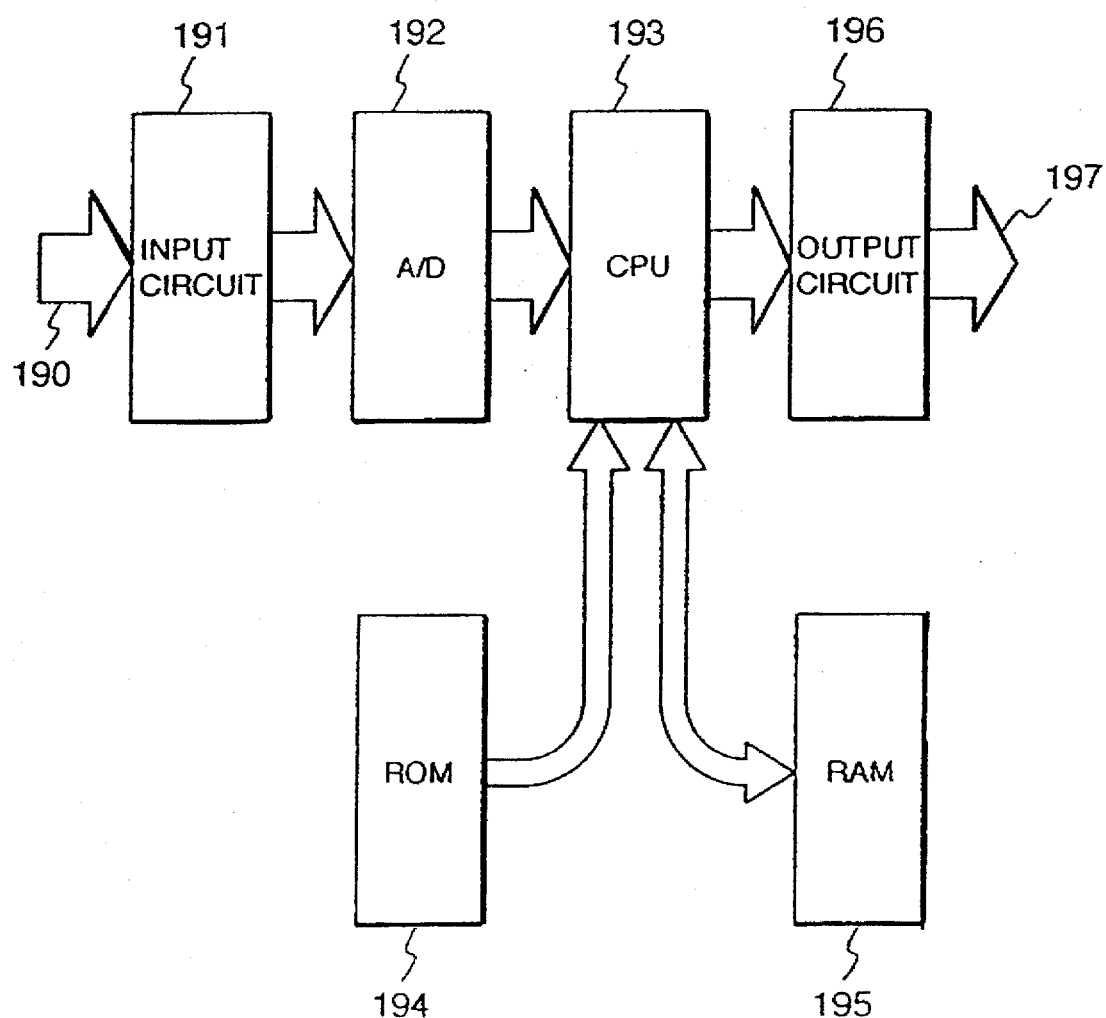
FIG. 18 is a block drawing representing the internal structure of controller 6.

The controller 6 contains the purge control unit, internal combustion engine control unit, air-fuel ratio control unit, variation range control unit, rich/lean evaluation unit, fuel shutoff unit at reduced speed, purge pipe system diagnostic unit and continuity diagnostic unit. As illustrated in FIG. 18, the controller 6 comprises the input circuit 191, A/D converter 192, a central processor 193, ROM 194, RAM 195 and output circuit 196. The input circuit 191 receives the input signal 190 (for example, signals from coolant temperature sensor 3, air intake volume sensor 4, throttle position sensor 5 and air-fuel ratio sensor 7), eliminates noise components, and outputs the signal to the A/D converter 192. The A/D converter 192 converts the signal from analog to digital form, and outputs the result to the central processor 193. The central processor 193 receives signals converted from analog to digital form, and executes the specified program stored in the ROM 194, thereby implementing above mentioned controls and diagnoses. The result of arithmetic operation and the result of analog-to-digital conversion are temporarily stored in the RAM 195. Furthermore, the result of calculation is output as control output signal 197 via the output circuit 196, and is used for the control of injector 8. It should be noted, however, that the configuration of controller 6 is not restricted to that shown in FIG. 18, other configurations being suitable as well.

Figure 2:
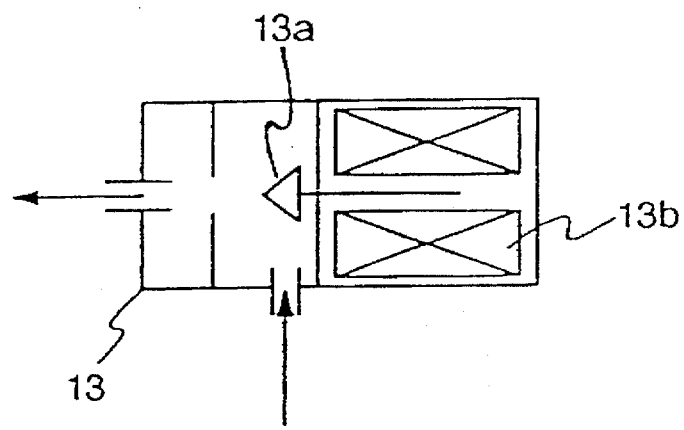
FIG. 2 is a schematic drawing representing the structure of the purge control valve.

FIG. 2 is a schematic diagram of the purge control valve 13, which comprises the valve mechanism 13a and solenoid valve 13b. When solenoid valve 13b is energized, the valve mechanism 13a is opened, causing a fuel vapor passage to open. Conversely, the valve mechanism 13a is closed when solenoid valve 13b is deenergized, causing the fuel vapor passage to close.

Figure 3:
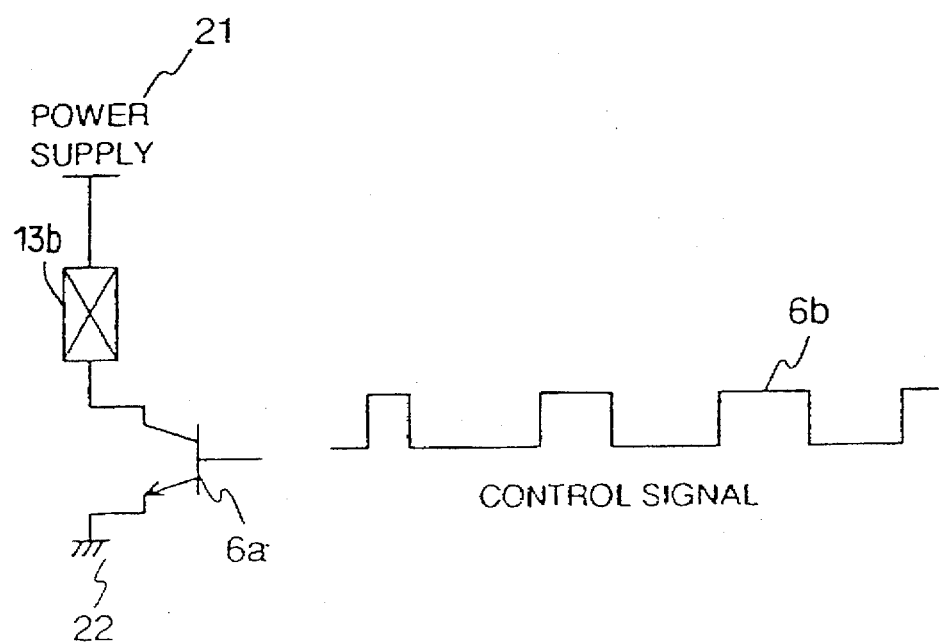
FIG. 3 is a drawing illustrating the purge control valve drive circuit.

FIG. 3 illustrates an arrangement for actuating the solenoid valve 13b. One end of the solenoid valve is connected to the power supply 21, while the other end is connected to the transistor circuit 6a, which can be composed of an FET or the like. The transistor circuit 6a is driven by the on/off duty-control signal 6b. Changing the on-off duty ratio also changes the ratio of when the valve is open and closed, which is substantially equivalent to changing the opening of fuel vapor passage, thereby controlling the amount of fuel vapor to be purged. The purge control valve 13 can be realized by a stepping motor, DC servo motor or linear solenoid valve. This embodiment has an advantage of being less costly.

Figure 4:
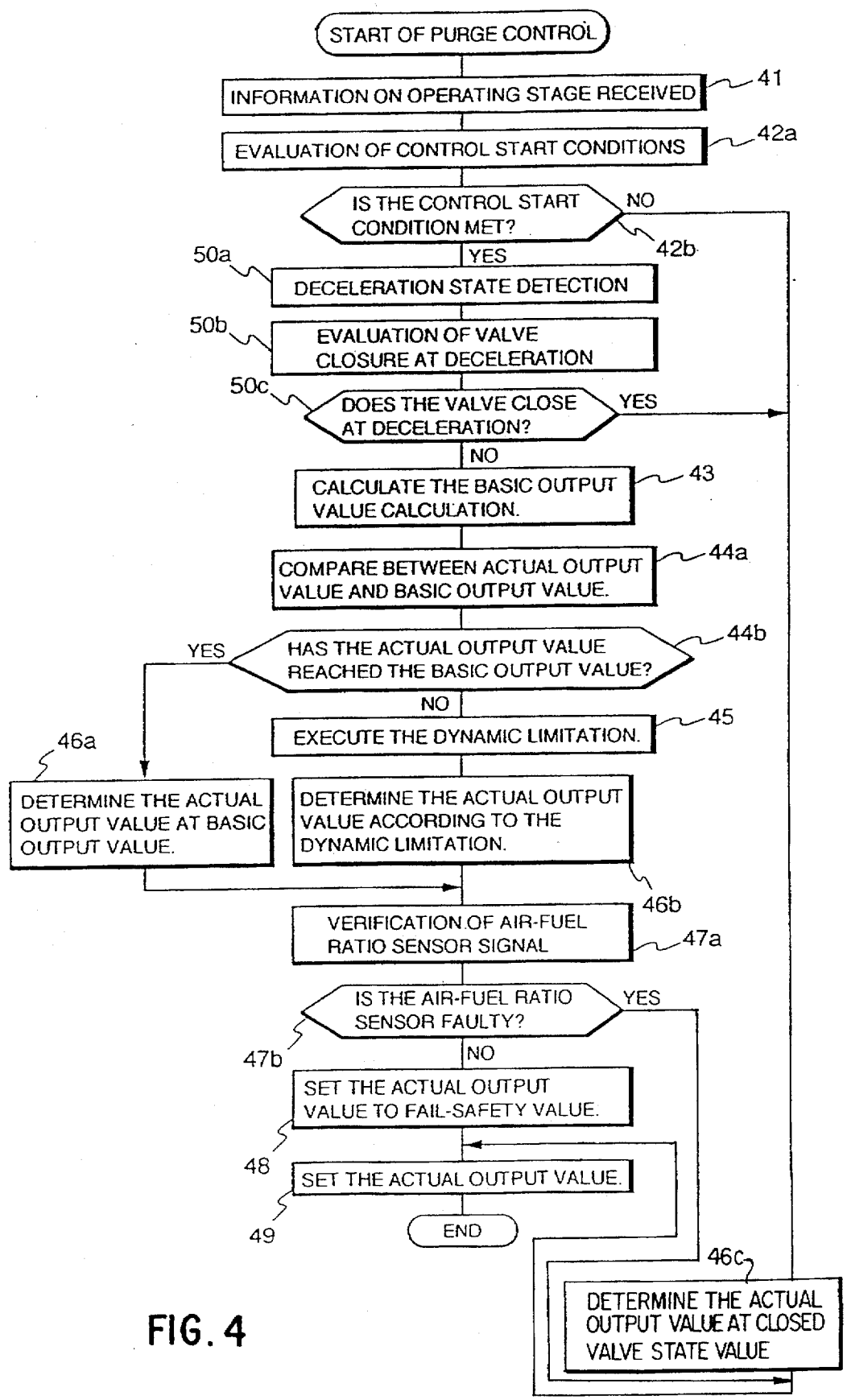
FIG. 4 is a drawing showing the purge control processing.

FIG. 4 illustrates the purge control function which is implemented at specified time intervals. Information on the operating state of the internal combustion engine 1 is input in step 41, including the speed and load of the internal combustion engine 1, as well as signals from coolant temperature sensor 3, throttle position sensor 5, and air-fuel ratio sensor 7. Based on this information it is determined in steps 42a and 42b whether or not purge control is already started, based, for example, on whether the internal combustion engine 1 has started and is warmed up, air-fuel ratio sensor 7 has actuated, or air-fuel ratio control is started.

When it is determined in step 42b that purge control has not yet started, control proceeds to step 46c in which the actual output value is determined for a closed state of the purge control valve 13. Control then proceeds to step 9, in which this actual output value is set as a duty value, and the procedure is terminated.

When it is determined in step 42b that purge control has started, processing advances to step 50a in which conditions indicative of a decrease of engine speed are detected. This information is evaluated in step 50b and it is determined in step 50c whether purge control valve 13 is closed in deceleration or not. (This determination is made based on the calculated amount of fuel vapor to be described later, if the fuel is shut off or the present time falls within the allowance time for fuel shutoff.) If it is determined in step 50c, in response to the result of step 50b, that the amount of fuel vapor is excessive and that the purge control valve is closed, processing advances to step 46c, where the actual output value is determined for the closed state of the purge control valve 13, and the actual output value is then set as the duty value, as described previously.

Figure 5:
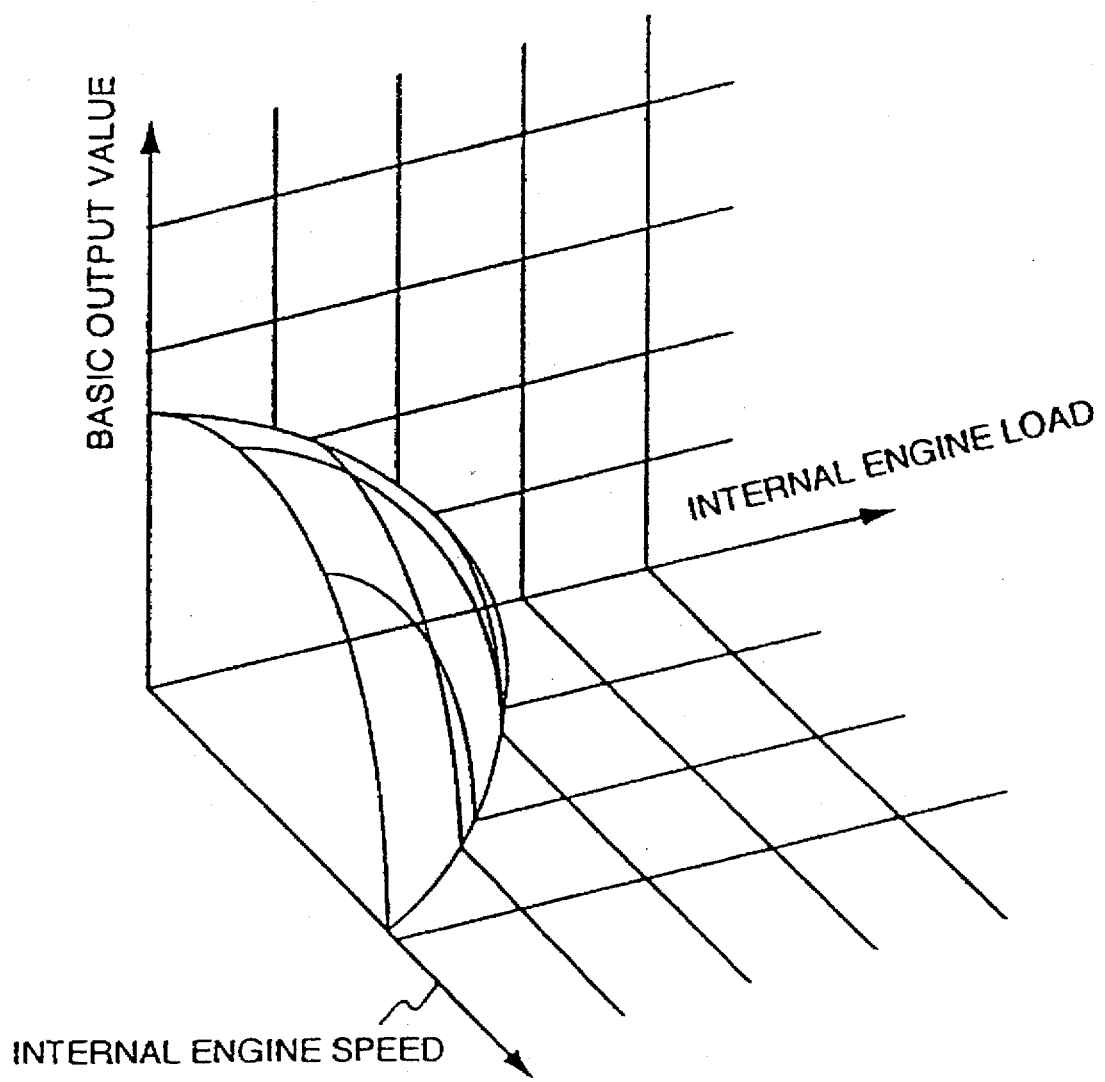
FIG. 5 is a drawing illustrating the purge control basic output value.

When deceleration is not detected in step 50a or when it has been determined in step 50b that there is no fuel shutoff and the purge control can be closed since the amount of fuel vapor is insufficient even during the allowance time for fuel shutoff, control proceeds to step 43, and the basic output value is determined as a function of the load and speed of the internal combustion engine, based on the characteristics shown in FIG. 5. The basic output value obtained in this manner is compared with the final actual output value in step 44a, and it is determined in step 44b whether dynamic limitation (to be described later) is to be terminated or not. When it is verified in steps 44a and 44b that the actual output value has already reached the basic output value, and that the dynamic limitation has been terminated, and processing advances to step 47a.

If it is determined in step 44b that dynamic limitation continues, the control proceeds to step 45 to implement dynamic limitation (to be described later). The actual output value determined in step 46b is obtained from the dynamic limitation, and the control proceeds to step 47a to check for any failure—such as, for example, a failure due to an open or short circuit—in the air-fuel ratio signal. If it is determined in step 47b that there is no failure, control proceeds to step 49, where the actual output value is set as the duty value, thereby terminating the current procedure.

When it is determined in step 47b that there is a failure in the air-fuel ratio signal, the actual output value is reset to a fail-safe value in step 48, and in step 49 the actual output value is set as the duty value, thereby terminating the current procedure. In this case, instead of setting it to the fail-safe value, the actual output value can be adjusted to a smaller value by setting the actual output value below the specified value, by compensating to ensure that the actual output value will be reduced by a specified percentage, or by changing the characteristics so that these restrictions are likely to change.

In the this embodiment, the basic output value is set according to the operating state of the internal combustion engine 1, which provides an advantage that optimum control of the purge control amount is possible in any area. Furthermore, dynamic limitation works only until the actual output value reaches the basic output value; thereafter, the purge control signal shifts according to the movement of the basic output value. This ensures highly effective purging, and at the same time allows purging to be started without adversely affecting the air-fuel ratio control. These advantages can be provided with a simple structure.

Figure 6:
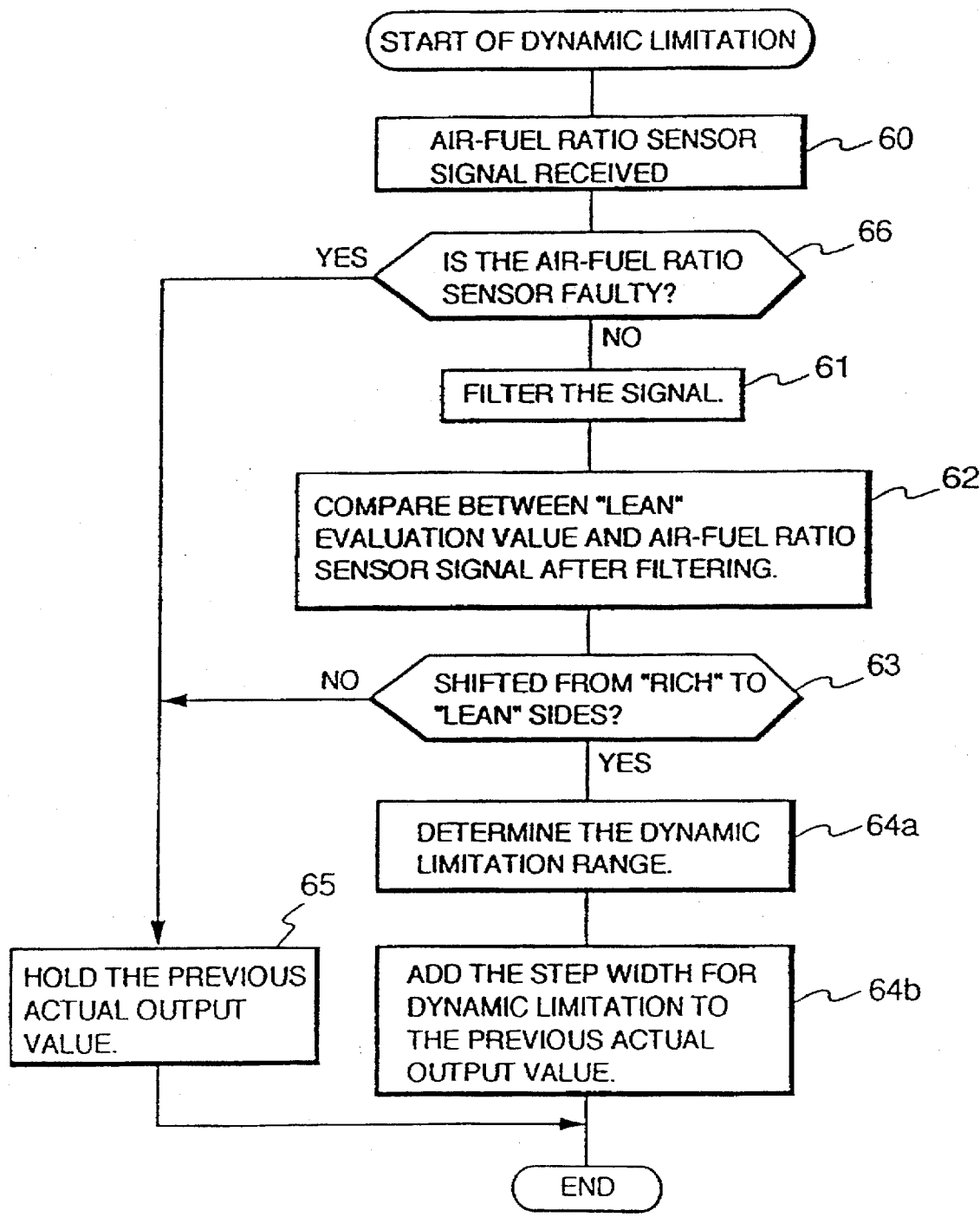
FIG. 6 is a drawing representing the purge control dynamic limitation.

FIG. 6 shows the dynamic limitation procedure, which is implemented at specified time intervals. The air-fuel ratio sensor signal is captured in step 60, and a determination is made in step 66 whether the signal is faulty due to an open or short circuit. When it is determined that the air-fuel ratio sensor is faulty, control proceeds to step 65. In this case, change of the air-fuel ratio sensor signal cannot be detected, so the step of dynamic limitation cannot proceed. Accordingly, the previous actual output value is held in step 65, and processing is terminated.

When it is determined in step 66 that there is no failure of the air-fuel ratio sensor signal, that signal is filtered in step 61. This may be realized by a low-pass filter using a linear retardation equation as illustrated in Mathematical Expression 1, or by other filter arrangements known to those skilled in the art.

Here gf denotes filtering gain (gf≦1), $O_2$ is an air-fuel ratio sensor signal, $O_2f$ represents the signal after filtering, and subscripts (i) and (i-1) indicate the current value and previous value, respectively.

$$O_2f_{(i)} = gf \times O_2 + (1-gf) \times O_2f_{(i-1)} \qquad (1)$$

Figure 9:
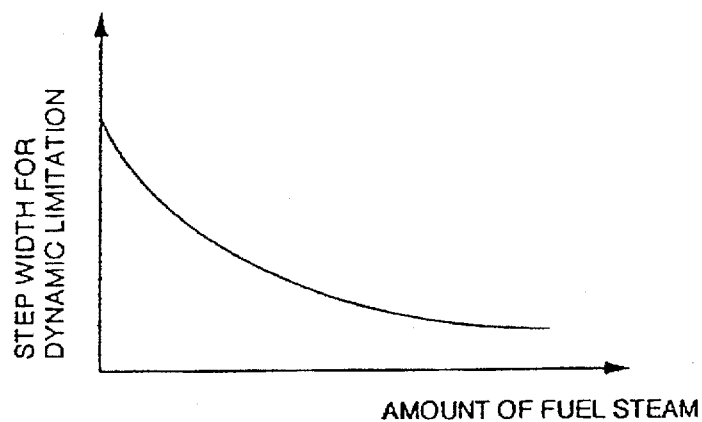
FIG. 9 is a drawing showing the amount of fuel vapor and step width in purge control dynamic limitation.

In step 62, the O₂f signal after filtering is compared with the "lean" evaluation value in order to determine whether the O₂f has shifted from the "rich" side to "lean" side. When it is determined in step 63 from the result of this comparison that it has shifted, then the control proceeds to step 64a, where the step width of dynamic limitation is determined according to the amount of fuel vapor to be described later. (FIG. 9 illustrates the relationship between the amount of fuel vapor and step width of dynamic limitation.) The step width determined in step 64a is then added to the previous actual output value in step 64b, and the processing of dynamic limitation is terminated.

If it is determined in step 63 that the O₂f has not shifted from the "rich" side to the "lean" side, control proceeds to step 65 where the previous actual output value is held, and processing of dynamic limitation is terminated.

According to this embodiment, the shift from "rich" to "lean" sides is determined based on the filtered air-fuel ratio signal. This arrangement has the advantage of being highly resistant to variations of noise or air-fuel ratio in different cylinders. Furthermore, filtering is expressed in a simple linear retardation equation. In addition, the computer program for dynamic limitation can be realized in blocks, which provides an advantage in facilitating computer programming.

Figure 7:
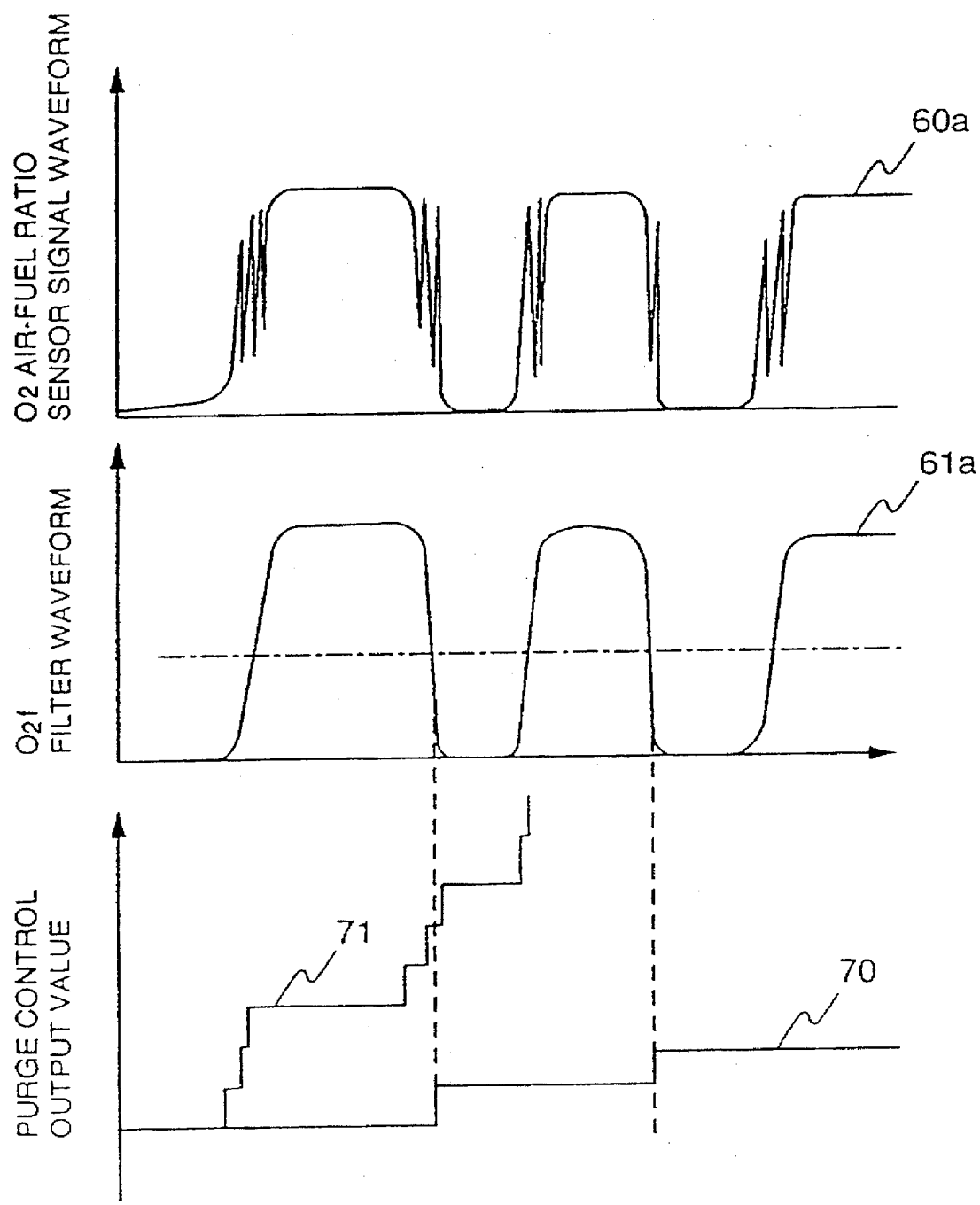
FIG. 7 is a drawing illustrating the relationship between the air-fuel ratio sensor signal movement and dynamic limitation movement.

FIG. 7 illustrates the operational difference between the use of filtered and unfiltered signals with respect to dynamic limitation. Numeral 70 indicates the purge control output value when the operation is performed based on the air-fuel ratio sensor signal after filtering, while numeral 71 indicates the case when the operation is performed before filtering.

Figure 8:
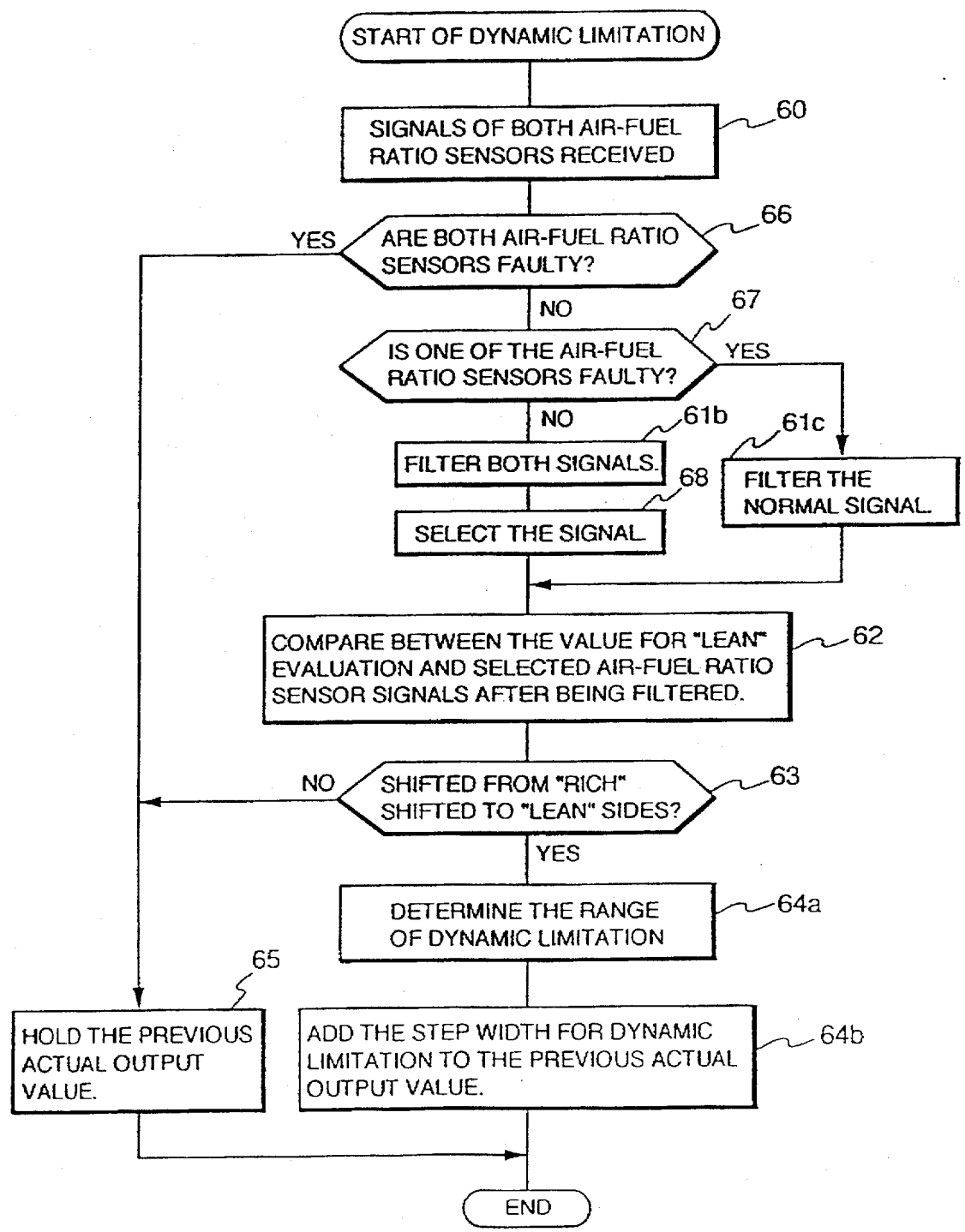
FIG. 8 is a drawing representing the processing of purge control dynamic limitation.

FIG. 8 illustrates an embodiment in which an air-fuel ratio sensor is provided for each bank, as in a V-type internal combustion engine. As before, this procedure is implemented at specified intervals. In step 60, air-fuel ratio sensor signal is input into the system as in FIG. 6. In this case, however, this is done with respect to the air-fuel ratio sensors for both banks. Then in step 66, it is determined whether both air-fuel ratio sensor signals are faulty due to open or short circuiting. When both are faulty, processing advances to step 65. In this case, because the shift of the air-fuel ratio sensor signal cannot be detected, the step of dynamic limitation cannot proceed, and accordingly the previous actual output value is held in step 65. Processing of dynamic limitation is then ended.

When it is determined in step 66 that at least one of the air-fuel ratio sensor signals functions normally, evaluation is made in step 67 to determine if both are normal or only one is normal. If both are determined to be normal, the control proceeds to step 61b, where both air-fuel ratio sensor signals are filtered. Then for alternate referencing of signals step 68 selects the signal to be referenced. If, on the other hand, only one signal is determined to be normal in step 67, the control proceeds to step 61c, where the normal signal is selected and filtered.

Next, in steps 62 to 65, the same processing as in FIG. 6 is carried out, based on the selected signal. According to the present embodiment, processing of both air-fuel ratio sensor signals is performed, so the computer program for dynamic limitation can be realized in blocks. This provides an advantage in facilitating computer programming.

Figure 10:
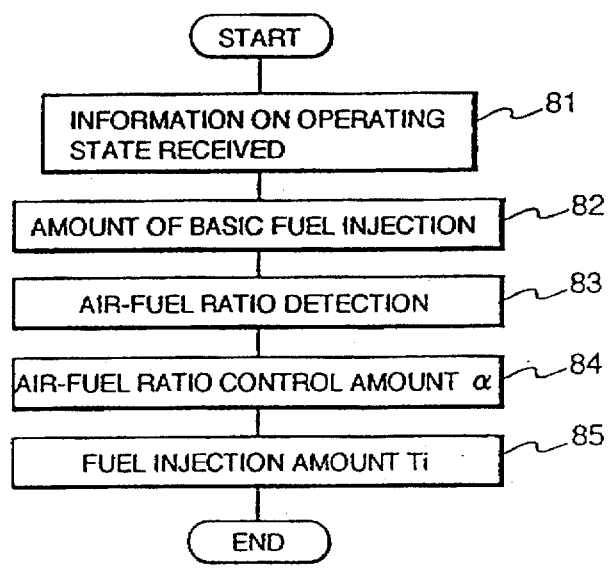
FIG. 10 is a drawing showing fuel injection control processing.

FIG. 10 shows the fuel injection amount control procedure, which is implemented for specified intervals.

Information on the internal combustion engine operating state is input in step 81, and based on these data, the basic fuel injection amount Tp is calculated in step 82, using the ratio between engine speed Ne and the amount of sucked air Qa, as in Mathematical Expression 2, in which K is a proportionally constant.

$$Tp = K \times (Qa/Ne) \qquad (2)$$

Figure 11:
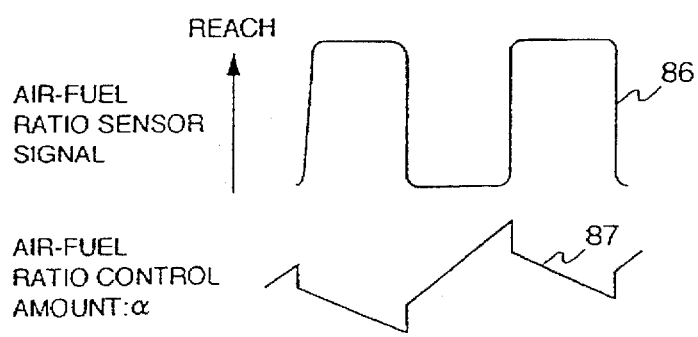
FIG. 11 is a drawing showing the relationship between the air-fuel ratio sensor signal and air-fuel ratio control amount $\alpha$.

The air-fuel ratio sensor signal is input in step 15, and the air-fuel ratio control value α is determined in step 84 according to the result. (FIG. 11 shows the relationship between α and the air-fuel ratio sensor signal.) The fuel injection amount Ti is calculated in step 85, from the product between the Tp and α, as in Mathematical Expression 3. (COEF represents a compensation coefficient to be set in conformity to coolant temperature or the like, while Ts denotes an injector characteristic compensation.)

$$Ti = COEF \times Tp \times \alpha + Ts \qquad (3)$$

Figure 12:
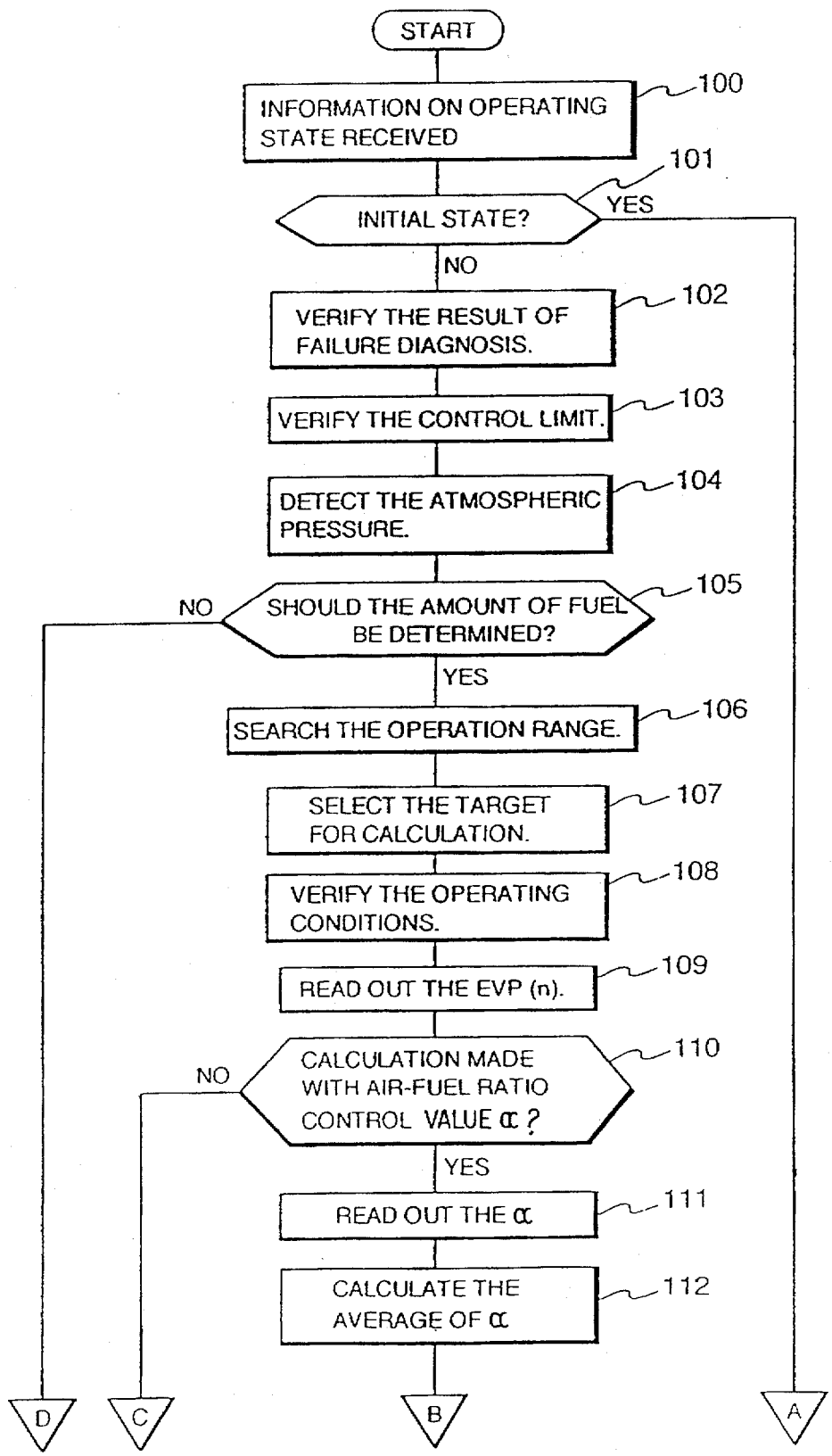
FIG. 12 is a drawing showing processing for calculation of the amount of fuel vapor.
Figure 13:
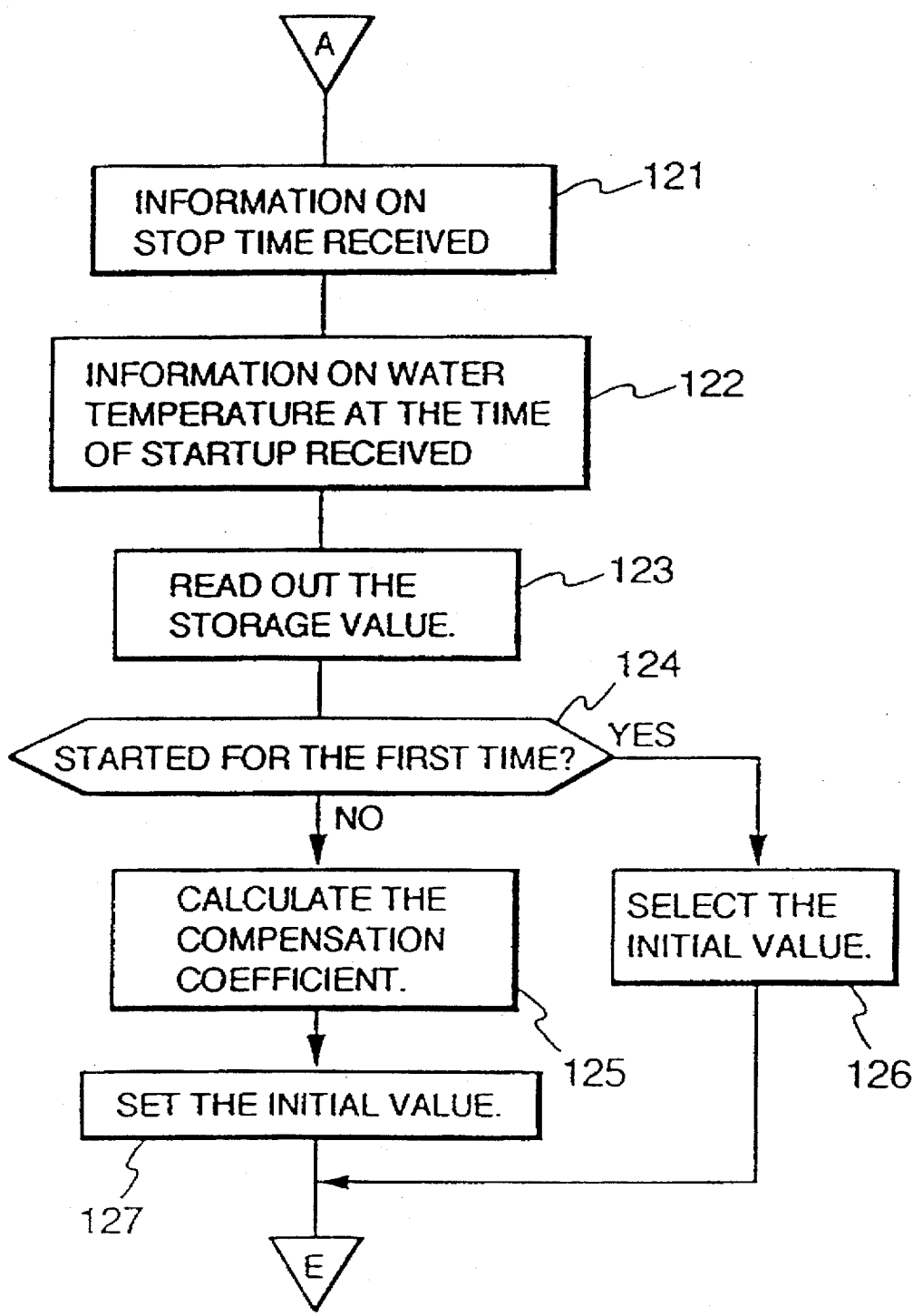
FIG. 13 is another drawing showing processing for calculation of the amount of fuel vapor.
Figure 14:
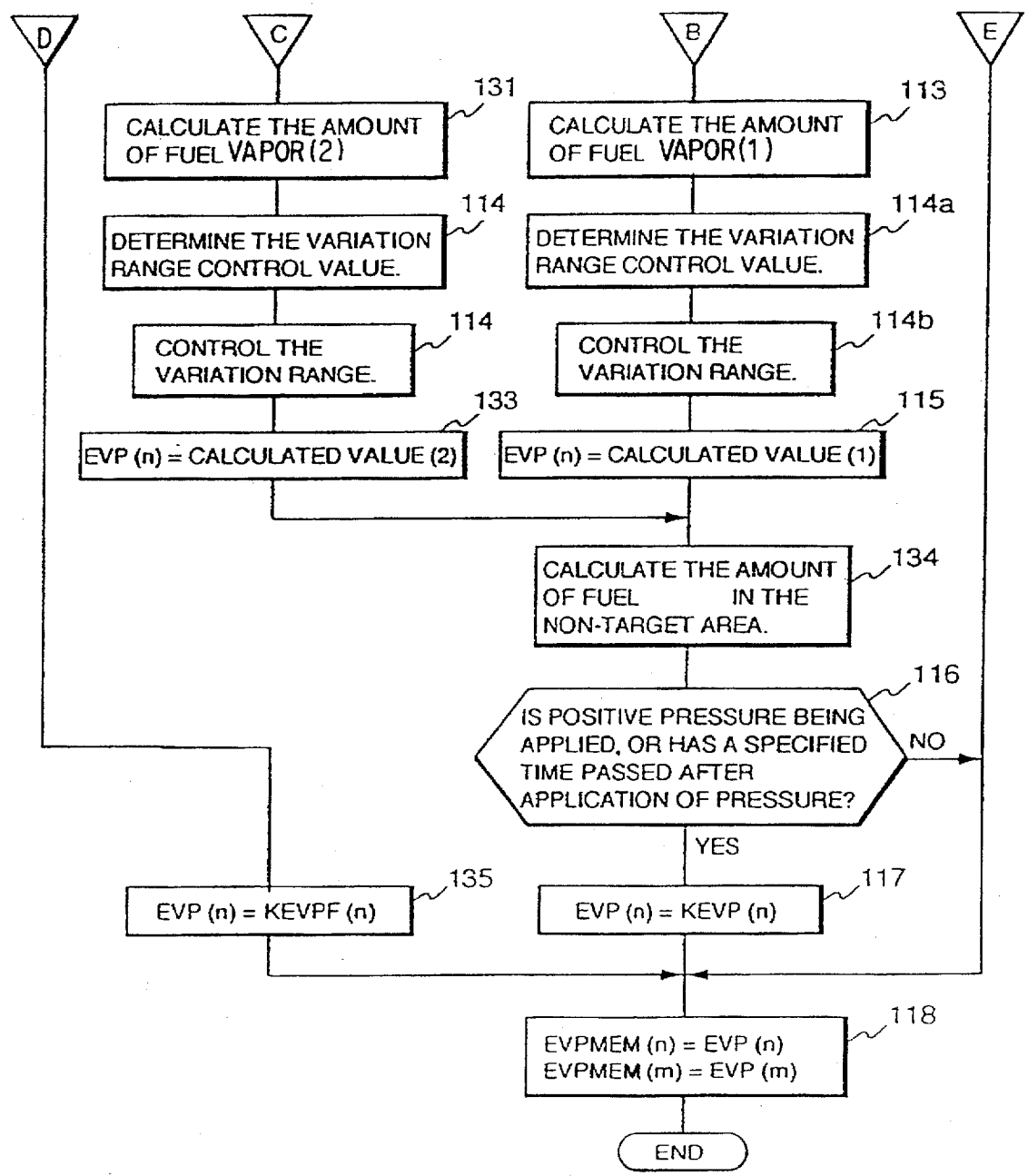
FIG. 14 is still another drawing showing processing for calculation of the amount of fuel vapor.

The procedure to calculate the amount of fuel vapor, which is repeatedly implemented at specified time intervals is illustrated in FIGS. 12, 13 and 14. Information on the internal combustion engine operating state is input in step 100, as in the case of step 81. The manner of processing in this case depends on whether this procedure is being implemented for the first time. When it is determined in step 101 that the state is initial, the control proceeds to step 121 in FIG. 13, in which information is received on the time ($T_{down}$) elapsed since the system power was turned off. ($T_{down}$ can be measured, for example, by reading the terminal voltage of the integrating circuit charged by system power when the system power turns on and starts; however, the present invention is not limited to this process.)

Step 122 receives information on water temperature TWs at the time of start-up, and step 123 reads a stored value for fuel vapor (EVPMEM(n)) from a nonvolatile memory. This value is set once to the amount of fuel vapor (EVP(n)). The symbol "n" in (EVPMEM(n)) and (EVP(n)) denotes the operation range. The order of steps 121 to 123 are not critical; and actual processing need not necessarily be implemented in the order shown.

Step 124 determines whether the operation is implemented for the first time, based on whether the $T_{down}$ obtained in step 121 is sufficiently long. It can also be determined, for example, by whether the temperature TWs obtained in step 122 is sufficiently low. When it is determined in step 124 that the operation is being implemented for the first time, control proceeds to step 126 to select the initial value for the amount of fuel vapor. This is done by setting EVP(n) to a value preset based on water temperature TWs determined at the time of start-up in step 122:

$$EVP(n) = f(TWs) \qquad (4)$$

When it is determined in step 124 that the operation is not being implemented for the first time, control proceeds to step 125, in which the state of fuel vapor is estimated when the engine is stopped, and the compensation coefficient required to set the initial value of the EVP(n) is calculated. For example, this EVP(n) may be compensated as a function of $T_{down}$ and TWs, as follows:

$$EVP(n) = EVP(n) \times f(T_{down}) \times f(TWs) \qquad (5)$$

This value EVP(n) is set as the initial value in step 127.

Returning to FIG. 12, when it is determined in step 101 that the state is not initial, control proceeds to step 102, where verification is performed to see if there is a failure in the sensor which detects the operating state of the internal combustion engine, or in the actuator which controls the internal combustion engine. Step 103 then checks whether the air-fuel ratio control value α or fuel injection amount Ti is at the control limit or not. Then atmospheric pressure is detected in step 104, which may be determined from the detection value of an atmospheric pressure sensor installed on the system, or from the internal inference/calculation value. (The order of steps 102 to 104 is not important; actual processing need not necessarily be implemented in the order shown.)

Step 105 determines whether or not fuel vapor should be calculated, based on whether various failures and control limits obtained in steps 102 to 104 have been found or reached, or whether the atmospheric pressure is extremely low. When it is determined that fuel vapor should not be calculated, control proceeds to step 135 in FIG. 14, where the EVP(n) is set to fail-safe state KEVPF(n), different fail-safe values being provided for different operational areas.

When it is determined in step 105 (FIG. 12) that fuel vapor should be calculated, control proceeds to steps 106 and 107 to select a value for EVP(n) corresponding to the current operation area to be calculated. Then step 108 verifies that the current operating state permits calculation of the fuel vapor amount using the air-fuel ratio control value α. This is to verify the stability in the current operation area, and is intended to assure that the variations for engine speed, load, throttle position and the like are within a specified range. At the same time, it also verifies that learning control of air-fuel ratio control is sufficiently performed, and the air-fuel sensor is already actuated. Thereafter, step 109 reads out the value of the EVP(n) selected at step 107.

Based on the verification in the previous step 108, the step 110 determines whether the fuel vapor amount can be calculated using the air-fuel ratio control value α. When it is determined that this is possible, control proceeds to step 111 to read out a value α. Then step 112 calculates the average ($α_{ave}$) of α, for example, by sampling α at specified time intervals and calculating the average sampled value. This can also be done by calculating the average of peak values when P components are generated if the classical PI control is used for air-fuel ratio control. EVP(n) is then calculated in step 113 using $α_{ave}$. When $α_{ave}$ is a compensatory coefficient and operation is centered at 1.0, EVP(n) is determined by using the deviation from that central value, as shown in the following expression:

$$EVP(n)=1.0-α_{ave}≧0 \tag{6}$$

Here, because the fuel vapor has the air-fuel ratio shifted toward the "rich" side, so long as this expression is used, EVP(n) cannot be a negative value. Accordingly, the minimum restriction is set at zero to ensure that the calculation value will be zero.

Figure 15:
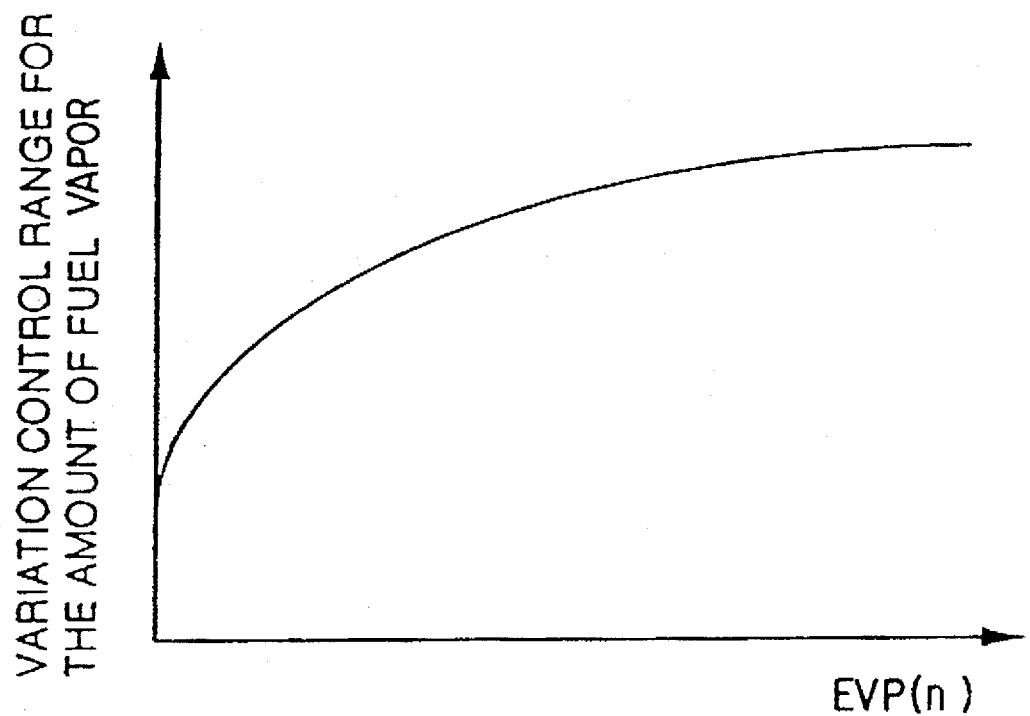
FIG. 15 is a drawing showing the amount of fuel vapor and variation control range for the amount of fuel vapor.

Next, the value gained from Mathematical Expression 6 variation range is controlled to ensure that the change from the previous value is not excessive. First, a variation control value is determined in step 114a, as shown in FIG. 15, for example, based on the previous value of EVP(n). (It can also be determined, for example, based on the deviation from the central value of α, the amount of purge control, or the atmospheric pressure which may affect the generation of fuel vapor.)

In step 114b, the value (1) calculated in step 113 is compared with the previous EVP (n), and when the difference is greater than the control value determined in step 114a, the variation ranged is controlled to ensure that the difference is kept below the control value. The value determined in this manner is held in step 115 as the EVP(n). As a result of this procedure, either the initial value determined in steps 125 and 126 or the amount of fuel vapor calculated from the operation state of the internal combustion engine (in a manner described later) can be rewritten into the value calculated from α.

When it is determined in step 110 that calculation cannot be made with air-fuel ratio control value α, the control proceeds to step 131 (FIG. 14), and the amount of fuel vapor is calculated based on the state of the internal combustion engine 1. As the purge control value and negative pressure of the suction system are increased, the amount to be purged increases and the amount of fuel vapor stored in the canister is reduced. Accordingly, the deviation of α is compensated, using the parameters, as shown in the following expression:

$$EVP(n)=EVP(n)_{(i-1)}+(1.0-α)×Kf \tag{7}$$

$$Kf=f(Qa, CPD) \tag{8}$$

where CPD represents purge control value, and $EVP(n)_{(i-i)}$ the previous value of EVP(n).

The previous value of EVP(n) is used, as stated above. That is, the value calculated with α up to the previous iteration is used as an initial value in calculation value $EVP(n)_{(i-i)}$; therefore, continuity of the EVP(n) is not lost, even if there is a state change, as in cases where α is used for the previous value (evaluation in step 110: YES) but not used for the current value (evaluation in step 110: NO).

In steps 114c and 114d, the variation range is controlled as in steps 114a and 114b, and the value calculated in this manner is set as EVP(n) in step 133.

In step 134, compensation is made for the EVP(m) in the operation range (m) which is not the target of the current calculation. In this manner, it possible to avoid a substantial discrepancy in the value EVP(n) to be read out, even when there is a change in the operation range. An example of such compensation is given below. This can be realized when the amount times the specified coefficient (Kc) for the change of the EVP(n) in the area (n) as a target for the current calculation as shown below is reflected in the EVP(n) in the area (m) which is not a target for the current calculation. The present invention, however, is not restricted to this particular process.

$$EVP(m)_{(i)}=EVP(m)_{(i-1)}+Kc×\{(EVP(n)_{(i)}-EVP(n)_{(i-1)})\} \tag{9}$$

Next, step 116 determines whether positive pressure is being applied to diagnose the purge pipe system, or whether a specified time period has elapsed after application of pressure. That is, it evaluates whether or not positive pressure remains in the purge pipe system. When it does, the control proceeds to step 117, and EVP(n) is set to the specified value KEVP(n). In this way, the amount of fuel vapor is forcibly set to a large value; by referencing this value, the state is preset so that a large amount of fuel vapor is generated, in the control where control characteristics are adjusted appropriately, thereby preparing for purge restart.

After step 135 or 117, EVP(n) and EVP(m) calculated in the above procedure are stored in the nonvolatile memories EVPMEM(n) and EVPMEM(m), respectively, and the calculation of the amount of fuel vapor is terminated.

Figure 16:
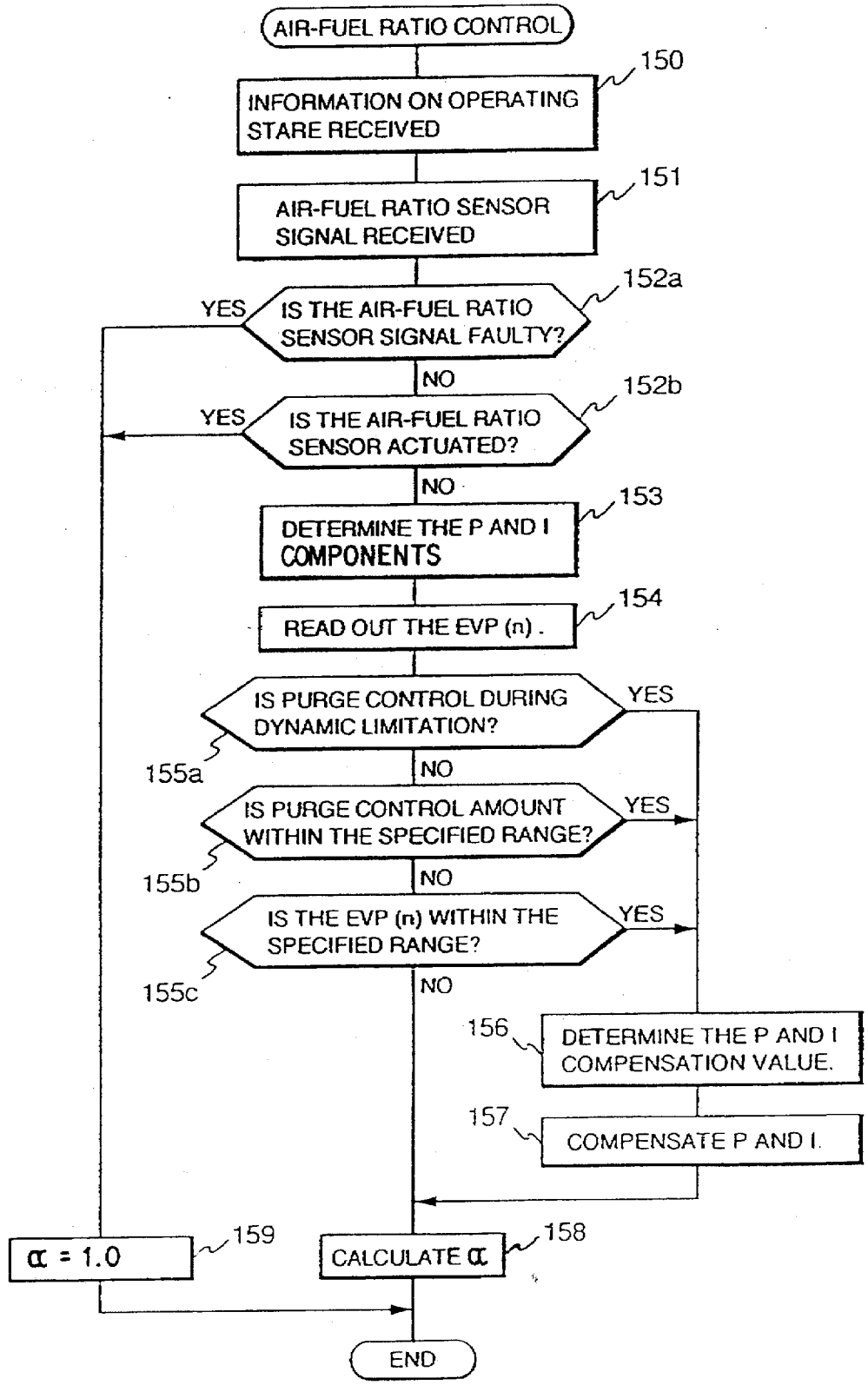
FIG. 16 is a drawing showing processing for air-fuel ratio control.

The air-fuel ratio control process is illustrated in FIG. 16, and is implemented at specified time intervals. First, step 150 receives information on the operation state of the internal combustion engine, similar to the above mentioned steps 41, 81 and 100. Then step 151 receives the air-fuel ratio sensor signal, and it is determined in step 152a whether the signal is faulty due to an open or short circuit, as in the case of step 66. When it is, or when the air-fuel ratio sensor is not actuated in step 152b, control proceeds to step 159, where the air-fuel ratio control value α is set to 1.0, and processing of air-fuel ratio control is terminated.

"Stop" of air-fuel ratio control in this Specification means simply that there is no sequential compensation of air-fuel ratio control value α in conformity to the output signal from air-fuel ratio sensor 7; it does not signify, however, that the air-fuel ratio control value α is not set, or that the air-fuel ratio of the mixed gas is not controlled at all.

Step 152b determines whether the air-fuel ratio sensor is actuated; that is, it evaluates whether air-fuel ratio control can be started, or not. For example, coolant temperature of the internal combustion engine and time elapsed after start-up, in addition to the air-fuel ratio sensor itself, can be used.

When step 152a determines that air-fuel ratio sensor is not faulty, and step 152b determines that it is actuated, control proceeds to step 153 to start air-fuel ratio control.

Step 153 determines the P and I components of the air-fuel ratio control speed value which serves as a standard. Next, step 154 reads out the value EVP(n) calculated in FIGS. 12 to 14. Step 155a determines whether the air-fuel ratio control characteristic should be changed due to actuation of dynamic limitation in the previous purge control. Furthermore, step 155b determines whether the purge control value is within a specified range (and hence, whether the air-fuel ratio control characteristic should be changed). In addition, step 155c determines whether the above mentioned amount of fuel vapor EVP(n) is within the specified value range (and whether the air-fuel ratio control characteristic should therefore be changed, because the amount of fuel vapor influences air-fuel ratio control).

If it has been determined in any of the above mentioned steps 155a, 155b and 155c that the air-fuel ratio control characteristic should be changed, the control proceeds to step 156, and determines the extent to which the P and I components of the air-fuel ratio control speed value should be compensated in each case. Using the compensation value thus determined, the P and I components are compensated in step 157, and the air-fuel ratio control value α is set accordingly in step 158 according to the value. Processing of air-fuel ratio control is then terminated.

When it has been determined in steps 155a, 155b and 155c that the air-fuel ratio control characteristic should not be changed, the air-fuel ratio control value α is set in step 158 without compensation, thereby terminating the processing of air-fuel ratio control.

Figure 17:
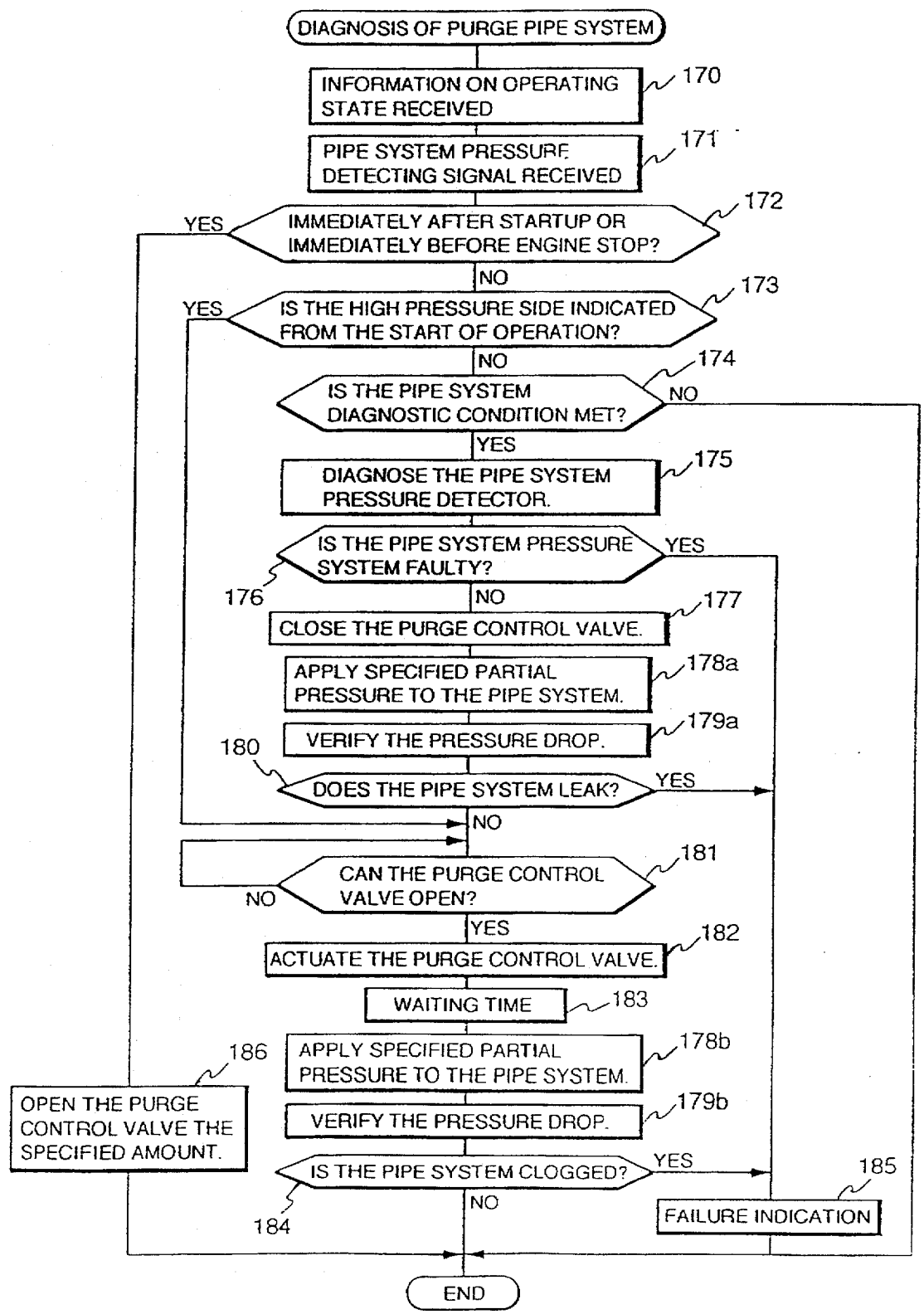
FIG. 17 is a drawing showing processing for purge pipe system diagnosis.

The diagnostic procedure for the purge pipe system is shown in FIG. 17. It should be noted that this example represents the flow of a series of procedures and operations for this diagnosis; actual computer program flow, however, need not necessarily be formed accordingly.

First, information on the operation state of the internal combustion engine is input in step 170, as in the case of steps 41, 81, 100 and 150. Next, step 171 receives a signal indicating the pressure of the purge pipe system. (This may be, for example, a pressure sensor signal representing the pressure directly, or a switch signal which is reversed at a specified pressure). In step 172 it is determined whether this is immediately after the start-up of the internal combustion engine 1 or immediately before stop. If so, control proceeds to step 186, and the purge control valve 13 is opened to a specified amount, allowing the positive pressure remaining in the purge pipe system to be released into the internal combustion engine 1, and preventing fuel vapor from being released directly into the atmosphere.

When it is determined in step 172 that the time is neither immediately after a start-up of the internal combustion engine 1 nor immediately before a stop, the control proceeds to step 173, in which it is determined whether the pipe system pressure signal (received in step 171) still indicates the high pressure from the beginning of the operation of the internal combustion engine 1. If it does, the control proceeds to step 181, thereby skipping diagnosis of the leakage from the pipe system. This prevents the possibility of diagnostic error with respect to pipe system leakage, due to residual pressure.

When it is determined in step 173 that the pipe system pressure signal does not indicate the high pressure from the beginning of the operation, step 174 determines whether the diagnostic conditions for the purge pipe system are met. (This is determined, for example, by whether or not the load and speed of the internal combustion engine 1, throttle position and coolant water temperature are within a specified value range.) When the diagnostic conditions are not met, diagnosis is terminated as it is. On the other hand, when it is determined that diagnostic conditions are met, the control proceeds to step 175, to diagnose whether there is a failure in the pressure detector of the pipe system. This makes it possible to diagnose whether the output signal indicates an open or short circuit, for example, when the pressure detector of the pipe system is a pressure sensor indicating the pressure. Diagnosis is made by determining whether the pressure gauge can turn on or off correctly in the case of a signal which is reversed at a specified pressure. Based on the result of this diagnosis, when it has been determined in step 176 that the pressure detector is faulty, control proceeds to step 185, and a failure is indicated, ending processing.

If step 176 determines that there is no failure in the pressure detector 20 of the pipe system, control proceeds to step 177, and the purge control valve 13 is closed. (Step 177 is not necessarily required if it is known with certainty that purge control valve 13 is closed for other reasons. For example, if purge control is not started because the secondary air pump 18 is actuated and the air-fuel ratio control is stopped, the purge control valve 13 is definitely closed.) A specified pressure is then applied to the pipe system in step 178a. For this purpose, pressure pump 14 may be operated for a specified time, or operation may be continued until pressure detector 20 of the pipe system indicates the specified value. Thereafter, step 179a detects how the pressure drops, for example, by measuring the time required for the pressure to drop by a specified amount, or by measuring the decrease of pressure within a specified time. When the pressure loss exceeds a specified value, step 180 determines that there is leak in the pipe system, and control proceeds to step 185.

If step 180 determines there is no leakage in the pipe system, control proceeds to step 181 to determine if the purge control valve can be opened or not. That is, if the purge control valve 13 is closed for another reason (for example, purge control is not started because the secondary air pump 18 is actuated and the air-fuel ratio control is stopped), then evaluation is made to determine whether such condition can be reset, and the purge control valve 13 can be opened.

If it is determined in step 181 that the purge control valve 13 can be opened, the control proceeds to step 182, and the purge control valve 13 is energized. After the lapse of a time specified in step 183, a clogging test of the pipe system is conducted. In the clogging test, pressure is applied to the pipe system in step 178b, similar to the case in step 178a, and it is determined in step 179b how the pressure has dropped, similarly to step 179a. When the pressure drop is smaller than the specified value, step 184 determines that a pipe system is clogged, and the control proceeds to step 185, in which a failure is indicated.

Failure indication is given by failure alarm lamp 19, based on the diagnosis made in any of the steps 176, 180 and 184. When step 184 determines that the pipe system is not clogged, processing is terminated.

According to the present embodiment, pressure detector 20 of the pipe system (FIG. 1) is diagnosed in step 175 when pipe system diagnostic conditions are met, thereby ensuring a highly reliable diagnosis.

The present invention achieves an accurate calculation of the amount of fuel vapor stored in the canister or the amount of fuel vapor supplied to the internal combustion engine from the canister, and ensures that the characteristics for the optimum purge control, internal combustion engine control and air-fuel ratio control are in conformity to such values. It also ensures that diagnosis is implemented without degrading the controllability of the internal combustion engine, when diagnosing failure by applying pressure to the purge pipe system. This ensures control of the internal combustion engine with minimum changes in air-fuel ratio, and at the same time, allows failure to be detected in the purge pipe system without misjudgment.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An internal combustion engine controller comprising:
   (a) a fuel tank;
   (b) a canister to store fuel vapor;
   (c) a purge pipe system leading from the fuel tank to an air suction system of the internal combustion engine via the canister;
   (d) a purge control unit acting on the purge control valve in the purge pipe system and controlling a volume of fuel vapor to be supplied to the internal combustion engine;
   (e) an internal combustion engine operating state detecting unit to determine an operating state of the internal combustion engine;
   (f) an internal combustion engine control unit to control the internal combustion engine according to its operating state;
   (g) an air-fuel ratio sensor to detect the air-fuel ratio of mixed fuel gas supplied to the internal combustion engine; and
   (h) an air-fuel ratio control unit to control the air-fuel ratio to a target ratio based on the result of detecting the air-fuel ratio;
   wherein said internal combustion engine controller further comprises a first calculation unit which uses a deviation of a detected air-fuel ratio from a control value of said air-fuel ratio control unit to perform a first calculation of at least one of the amount of fuel vapor stored in said canister and the amount of the fuel supplied to said internal combustion engine, when the purge control valve is open and said internal combustion engine is at a specified operating state.

2. An internal combustion engine controller according to claim 1 further comprising a second calculation unit, which performs a second calculation of the amount of fuel vapor stored in the canister or the amount of the fuel supplied to the internal combustion engine, based on one of the control value of the purge control unit, the internal combustion engine operating state detection value and continuation of the current internal combustion engine operating state, when the internal combustion engine is not at said specified operating state.

3. An internal combustion engine controller according to claim 2 wherein an initial value of the second calculation by said second calculation unit is a result of the first calculation by said first calculation unit.

4. An internal combustion engine controller according to claim 3 wherein when an operating state of the engine shifts to the specified operating state during a second calculation by the second calculation unit, and when a first calculation is made concurrently by said first calculation unit, a result of said second calculation is replaced by a result of said first calculation by said first calculation unit implemented after said shift.

5. An internal combustion engine controller according to claim 2 wherein a single fuel vapor amount is derived from a result of the first calculation and the second calculation.

6. An internal combustion engine controller according to claim 1 wherein:
   the operation range of the internal combustion engine is determined from among a plurality of operating ranges comprising at least an engine load, engine speed and throttle position; and
   each of said calculation units is used for each of a plurality of operation ranges, thereby obtaining an amount of fuel vapor corresponding to each of said operation ranges.

7. An internal combustion engine controller according to claim 6 wherein when results of said first and second calculations corresponding to a detected operation range have been obtained, or when said amount of fuel vapor was obtained, the internal combustion engine controller compensates for the amount of stored fuel vapor or the amount of supplied fuel vapor corresponding to the operation range other than the range according to these values.

8. An internal combustion engine controller according to claim 6 wherein:
   a storage area is reserved in a non-volatile memory corresponding to each of said plurality of operation ranges;
   an amount of fuel vapor calculated in each of said operation ranges is stored in said storage area corresponding to each operation range; and
   said calculation is implemented by using a read-out value for the amount stored for a current operation range, thereby obtaining an amount of fuel vapor.

9. An internal combustion engine controller according to claim 1 wherein said internal combustion engine controller further comprises:
   (a) a calculating function failure detecting unit to detect a failure of the calculation unit;
   (b) a calculating function detecting unit to show that said calculation unit has recovered from said failure and is ready to function; and
   (c) a surrounding condition detecting unit to estimate or detect environmental conditions of said fuel tank, canister and purge pipe system in a case of said calculating function failure;
   wherein said internal combustion engine controller sets at least one of a storage value, a calculated value and an amount of fuel vapor to a specified value or compensates for it in conformity to said environmental conditions in said calculating function failure at the start of said calculating function.

10. An internal combustion engine controller according to claim 1 wherein said internal combustion engine control unit further comprises:
    (a) a sensor failure diagnostic unit to detect a failure of said internal combustion engine operating state detecting unit, and failure of said air-fuel ratio sensor; and
    (b) a control limit arrival detecting unit to detect that any of said internal combustion engine control and said air-fuel ratio control unit has reached a limit of a controllable range;
    wherein said internal combustion engine controller stops said calculation unit when it has detected that any of said sensor failure diagnostic unit and control limit arrival detecting unit has failed or reached a control limit, and sets said amount of fuel vapor to a separately specified value in response thereto.

11. An internal combustion engine controller according to claim 1 wherein said internal combustion controller comprises a variation control unit to keep variations in calculation results or amount of fuel vapor within a specified variation range when obtaining a result of said first calculation by said first calculation unit or when obtaining said amount of fuel vapor.

12. An internal combustion engine controller according to claim 1 wherein variations controlled by said variation control unit are determined by at least a calculation factor further comprising at least one of physical parameters affecting said calculation results, said amount of fuel vapor, said fuel engine operations, control value by said air-fuel ratio control unit, control value by said purge control unit, and amount of fuel vapor generated.

13. An internal combustion engine controller according to claim 1 wherein said internal combustion engine controller further comprises a purge control unit to raise internal pressure in said purge pipe system with said purge control valve kept closed, and provides specified restriction or compensation to calculation results by the first calculation unit or said amount of fuel vapor based on the operation of the pressurizing means of said purge pipe system.

14. An internal combustion engine controller according to claim 1 wherein said internal combustion engine controller comprises a means to detect at least one of environmental condition parameters for said fuel tank, canister and purge pipe system, as well as fuel condition parameters, and restricts said calculation unit based on said detection or compensates for at least a result of one of said first and second calculations or said amount of fuel vapor.

15. An internal combustion engine controller according to claim 1 wherein said internal combustion engine controller further comprises means to change control characteristics of one of a purge control valve speed, purge control valve position, and air-fuel ratio control speed, in conformity to results of said first and second calculations or said amount of fuel vapor.

16. An internal combustion engine controller according to claim 1 wherein said internal combustion engine controller further comprises:
    (a) a reduced speed fuel shutoff unit which shuts off fuel supply to said internal combustion engine at a specified time after detecting a speed reduction, and makes a determination whether said purge control valve should be set to a purge shutoff condition during said specified period of time in conformity to at least one of said first and second calculation results and said amount of fuel vapor; and
    (b) means to set said purge control value to the purge shutoff condition according to said determination.

17. An internal combustion engine controller comprising:
    (a) a fuel tank;
    (b) a canister to store fuel vapor;
    (c) a purge pipe system leading from the fuel tank to an air suction system of the internal combustion engine via the canister;
    (d) a purge control unit that generates a purge control value which acts on a purge control valve installed in the purge pipe system and controls a volume of fuel vapor to be supplied to said internal combustion engine;
    (e) an internal combustion engine operating state detecting unit to determine an operating state of the internal combustion engine;
    (f) an internal combustion engine control unit to control the internal combustion engine according to its operating state;
    (g) an air-fuel ratio sensor to detect a air-fuel ratio of mixed fuel gas supplied to the internal combustion engine; and
    (h) an air-fuel ratio control unit to control said air-fuel ratio to a target ratio based on a result of detecting the air-fuel ratio; wherein
    said internal combustion engine control unit further comprises a rich/lean evaluation unit to distinguish between a "richer" side and a "leaner" side relative to a specified air-fuel ratio;
    said purge control value is controlled so as to increase it by a specified range when the amount of fuel vapor supplied to said internal combustion engine is increased and when an evaluation of said rich/lean evaluation unit has shifted from "richer" to "leaner"; and
    said purge control value is otherwise maintained by controlling said purge control valve in a direction of opening it through said purge control unit.

18. An internal combustion engine controller according to claim 17 wherein said rich/lean evaluation unit evaluates an output from the air-fuel ratio sensor after said output is filtered through a low-pass filter.

19. An internal combustion engine controller according to claim 17 wherein:
    said internal combustion engine is a multi-cylinder engine having groups of cylinders, each of said groups being provided with an air-fuel ratio sensor;
    said internal combustion engine control unit further comprises:
    (a) an air-fuel ratio control unit for each group of cylinders to control said air-fuel ratio of mixed gas supplied to said internal combustion engine to a target ratio for each group based on a result of detecting said air-fuel ratio;
    (b) a low-pass filter which receives results of detection of said air-fuel ratio detector for each group;
    (c) a rich/lean evaluation unit to determine whether a filtered air-fuel ratio detection value generated by said filter is "richer" or "leaner" than a specified air-fuel ratio; and
    (d) means to increase said purge control amount by a specified range when the evaluation of said rich/lean evaluation unit has shifted from "richer" to "leaner", and to otherwise maintain said control amount without change; and
    a shift from "richer" to "leaner" for each group is referenced alternately.

20. An internal combustion engine controller according to claim 19 further comprising an air-fuel ratio detector failure diagnostic unit to determine whether said air-fuel ratio detecting unit for each group is faulty;

wherein, if said air-fuel ratio detector failure diagnostic unit detects a failure in any of said plurality of air-fuel ratio sensors, said shift from "richer" to "leaner" is detected based on filtered detection results of air-fuel ratio sensors which have not failed.

21. An internal combustion engine controller according to claim 19 wherein, if said air-fuel ratio detector failure diagnostic unit detects failure in at least one of the air-fuel ratio sensors for said respective groups of cylinders, control of the group with said failure is stopped, and a control value of said purge control unit is set to a predetermined value or an upper limit value is set to said control value.

22. An internal combustion engine controller according to claim 17 wherein said internal combustion engine control unit uses amounts of fuel vapor derived from results of one of calculations by said first and second calculation units to detect a shift from a "richer" to a "leaner" air-fuel ratio, and a range of increasing said purge control amount in conformity to said shift is changed and controlled according to at least one of said first and second calculation results, said amount of fuel vapor and a control value of said air-fuel ratio control unit.

23. An internal combustion engine controller according to claim 2 wherein said purge control valve is controlled in the direction of opening by said purge control unit, and characteristics of said air-fuel ratio control unit are changed and controlled according to at least one of said first and second calculation results and said amount of fuel vapor, when an amount of fuel vapor supplied to said internal combustion engine is increased.

24. An internal combustion engine controller comprising:
 (a) a fuel tank;
 (b) a canister to store fuel vapor;
 (c) a purge pipe system leading from the fuel tank to an air suction system of the internal combustion engine via the canister;
 (d) a purge control unit which controls a purge control valve in said purge pipe system and a volume of fuel vapor supplied to the internal combustion engine;
 (e) an internal combustion engine operating state detecting unit to detect an operating state of the internal combustion engine;
 (f) an internal combustion engine control unit to control the internal combustion engine according to its operating state;
 (g) an air-fuel ratio sensor to detect an air-fuel ratio of mixed fuel gas supplied to said internal combustion engine;
 (h) an air-fuel ratio control unit to control said air-fuel ratio to a target ratio base on a result of detecting said air-fuel ratio; and
 (i) a purge pipe system pressurizing unit to raise internal pressure in the purge pipe system with the purge control valve kept closed; and
 (j) at least one of a means to reduce opening speed of said purge control valve and a means to increase an air-fuel ratio control response characteristic when a closing of said purge control valve is released after applying pressure to said purge pipe system.

25. An internal combustion engine controller comprising:
 (a) a fuel tank;
 (b) a canister to store fuel vapor;
 (c) a purge pipe system leading from a fuel tank to an air suction system of the internal combustion engine via the canister;
 (d) a purge control unit which controls a purge control valve in said purge pipe system and a volume of fuel vapor supplied to the internal combustion engine;
 (e) an internal combustion engine operating state detecting unit to detect an operating state of the internal combustion engine;
 (f) an internal combustion engine control unit to control the internal combustion engine according to its operating state;
 (g) an air-fuel ratio sensor to detect an air-fuel ratio of mixed fuel gas supplied to the internal combustion engine;
 (h) an air-fuel ratio control unit to control said air-fuel ratio to a target ratio based on a result of detecting said air-fuel ratio; and
 (i) a purge pipe system pressurizing unit to raise internal pressure on said purge pipe system with said purge control valve kept closed; wherein
 pressure is applied to said purge pipe system before said air-fuel ratio control starts.

26. An internal combustion engine controller according to claim 25 further comprising a secondary air feed device to introduce fresh air into an exhaust system of said internal combustion engine, wherein part or all of a time to apply pressure to said purge pipe system is contained in a period of time during which said secondary air feed device is operating.

27. An internal combustion engine controller comprising:
 (a) a fuel tank;
 (b) a canister to store fuel vapor;
 (c) a purge pipe system leading from the fuel tank to an air suction system of the internal combustion engine via the canister;
 (d) a purge control unit which controls a purge control valve installed in said purge pipe system and a volume of fuel vapor supplied to the internal combustion engine;
 (e) an internal combustion engine operating state detecting unit to detect an operating state of the internal combustion engine;
 (f) an internal combustion engine control unit to control the internal combustion engine according to its operating state;
 (g) an air-fuel ratio sensor to detect an air-fuel ratio of mixed fuel gas supplied to the internal combustion engine;
 (h) an air-fuel ratio control unit to control the air-fuel ratio to a target ratio based on a result of detecting the air-fuel ratio;
 (i) a purge pipe system pressurizing unit to raise internal pressure in said purge pipe system with said purge control valve kept closed;
 (j) a pressure detecting unit to detect the pressure in said purge pipe system; and
 (k) a purge pipe system diagnostic unit to diagnose failure of said purge pipe system according to a result of pressure detection by said pressure detecting unit;

wherein said purge pipe system diagnostic procedure is modified, or either diagnostic result or diagnosis history is set to a specified state, if said result of pressure detection indicates that said pressure has remained above a specified pressure since start of said internal combustion engine.

28. An internal combustion engine controller comprising:
(a) a fuel tank;
(b) a canister to store fuel vapor;
(c) a purge pipe system leading from the fuel tank to an air suction system of the internal combustion engine via said canister;
(d) a purge control unit which controls a purge control valve in said purge pipe system and a volume of fuel vapor to be supplied to the internal combustion engine;
(e) an internal combustion engine operating state detecting unit to detect an operating state of the internal combustion engine;
(f) an internal combustion engine control unit to control the internal combustion engine according to its operating state;
(g) an air-fuel ratio sensor to detect an air-fuel ratio of mixed fuel gas supplied to said internal combustion engine;
(h) an air-fuel ratio control unit to control said air-fuel ratio to a target ratio based on the result of detecting said air-fuel ratio;
(i) a purge pipe system pressurizing unit to raise internal pressure in the purge pipe system with the purge control valve kept closed;
(j) a pressure detecting unit to detect the pressure in said purge pipe system; and
(k) a purge pipe system diagnostic unit to diagnose failure of said purge pipe system according to a result of pressure detection by said pressure detecting unit;
wherein residual pressure in said purge pipe system is reduced by opening said purge control valve for a specified time either before or after said internal combustion engine stops, or before said purge pipe system diagnosis procedure starts.

29. An internal combustion engine controller comprising:
(a) a fuel tank;
(b) a canister to store fuel vapor;
(c) a purge pipe system leading from the fuel tank to an air suction system of the internal combustion engine via the canister;
(d) a purge control unit which controls a purge control valve in said purge pipe system and a volume of fuel vapor supplied to said internal combustion engine;
(e) an internal combustion engine operating state detecting unit to detect an operating state of the internal combustion engine;
(f) an internal combustion engine control unit to control the internal combustion engine according to its operating state;
(g) an air-fuel ratio sensor to detect an air-fuel ratio of mixed fuel gas supplied to said internal combustion engine;
(h) an air-fuel ratio control unit to control said air-fuel ratio to a target ratio based on a result of detecting said air-fuel ratio;
(i) a purge pipe system pressurizing unit to raise internal pressure of said purge pipe system with said purge control valve kept closed;
(j) a pressure detecting unit to detect pressure in said purge pipe system;
(k) a purge pipe system diagnostic unit to diagnose failure of said purge pipe system according to a result of pressure detection by said pressure detecting unit; and
(l) a continuity diagnostic unit to open said purge control valve for a specified time and to diagnose the continuity of said purge pipe system including said purge control valve based on pressure of said purge pipe system after said valve is opened from the closed position;
wherein continuity of said purge pipe system is diagnosed by said continuity diagnostic unit at a specified period of time after said purge control valve is driven.

* * * * *